United States Patent
Nishikawa et al.

(10) Patent No.: US 10,899,198 B2
(45) Date of Patent: Jan. 26, 2021

(54) AIR CONDITIONER FOR VEHICLE

(71) Applicant: DENSO CORPORATION, Kariya (JP)

(72) Inventors: Michio Nishikawa, Kariya (JP); Atsushi Inaba, Kariya (JP); Hiroaki Kawano, Kariya (JP); Naoya Makimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 571 days.

(21) Appl. No.: 15/307,849

(22) PCT Filed: Apr. 27, 2015

(86) PCT No.: PCT/JP2015/002261
§ 371 (c)(1),
(2) Date: Oct. 31, 2016

(87) PCT Pub. No.: WO2015/174035
PCT Pub. Date: Nov. 19, 2015

(65) Prior Publication Data
US 2017/0050493 A1 Feb. 23, 2017

(30) Foreign Application Priority Data

May 13, 2014 (JP) .................................. 2014-099635

(51) Int. Cl.
*B60H 1/03* (2006.01)
*B60H 1/32* (2006.01)
*B60H 1/00* (2006.01)

(52) U.S. Cl.
CPC ........... *B60H 1/03* (2013.01); *B60H 1/00342* (2013.01); *B60H 1/00835* (2013.01);
(Continued)

(58) Field of Classification Search
CPC . B60H 1/02; B60H 1/025; B60H 1/03; B60H 1/034; B60H 1/038; B60H 1/14;
(Continued)

(56) References Cited

U.S. PATENT DOCUMENTS

2005/0056413 A1* 3/2005 Homan .............. B60H 1/00921
165/203
2006/0225441 A1* 10/2006 Goenka .............. B60H 1/00478
62/115
(Continued)

FOREIGN PATENT DOCUMENTS

CN 102271943 A 12/2011
DE 10011172 A1 9/2000
(Continued)

OTHER PUBLICATIONS

Atkins, T., & Escudier, M. (2013). refrigeration cycle. In a Dictionary of Mechanical Engineering. : Oxford University Press,. Retrieved Jun. 20, 2019, from https://www.oxfordreference.com/view/10.1093/acref/9780199587438.001.0001/acref-9780199587438-e-5135. (Year: 2013).*

*Primary Examiner* — Jianying C Atkisson
*Assistant Examiner* — Miguel A Diaz
(74) *Attorney, Agent, or Firm* — Harness, Dickey & Pierce, P.L.C.

(57) ABSTRACT

A heater core for performing heat exchange between a coolant and ventilation air to be blown to the interior of a vehicle so as to heat the ventilation air is disposed in a water circulation circuit for circulating a coolant in an engine EG for outputting driving force necessary to move the vehicle. When the temperature of the coolant discharged from the engine EG is low, a heat transport refrigeration cycle device, serving as a heat transport unit for absorbing heat from a downstream coolant at a position downstream more than the heater core and dissipating the heat absorbed from the
(Continued)

downstream coolant to an upstream coolant at a position upstream more than the heater core, is operated to increase the temperature of the coolant introduced into the heater core until the temperature of the coolant reaches the temperature necessary to heat the interior of the vehicle, without operation of the engine EG.

12 Claims, 9 Drawing Sheets

(52) U.S. Cl.
CPC ......... *B60H 1/00899* (2013.01); *B60H 1/034* (2013.01); *B60H 1/323* (2013.01); *B60H 1/32284* (2019.05); *B60H 1/00478* (2013.01); *B60H 2001/00928* (2013.01)

(58) Field of Classification Search
CPC . B60H 1/143; B60H 1/20; B60H 1/22; B60H 1/00342; B60H 1/3204; B60H 1/323; B60H 1/00478; B60H 1/06; B60H 1/08; B60H 1/10; B60H 2001/00121; B60H 2001/00928; B60H 1/3227; B60H 1/3228; B60H 2001/3888; F25B 21/00; F25B 21/02; F25B 2321/02; F25B 2321/023; F25B 2321/025; F25B 2321/0252; F24F 5/0042

See application file for complete search history.

(56) References Cited

U.S. PATENT DOCUMENTS

| | | | | |
|---|---|---|---|---|
| 2011/0048671 | A1* | 3/2011 | Nishikawa | B60H 1/00885 165/42 |
| 2011/0120146 | A1* | 5/2011 | Ota | B60H 1/00885 62/3.3 |
| 2011/0259287 | A1* | 10/2011 | Kakehashi | F01P 7/164 123/41.09 |
| 2012/0017637 | A1* | 1/2012 | Nakajo | B60H 1/03 62/515 |
| 2012/0102974 | A1* | 5/2012 | Kawazoe | B60H 1/00035 62/3.61 |
| 2012/0222429 | A1* | 9/2012 | Ban | B60H 1/00478 62/3.61 |
| 2012/0253573 | A1* | 10/2012 | Shigyo | B60H 1/00421 701/22 |
| 2013/0081419 | A1* | 4/2013 | Katoh | B60H 1/004 62/278 |
| 2013/0213631 | A1* | 8/2013 | Ichishi | B60H 1/00021 165/202 |
| 2013/0333395 | A1* | 12/2013 | Morita | B60H 1/004 62/3.61 |
| 2014/0041826 | A1* | 2/2014 | Takeuchi | B60L 1/02 165/10 |
| 2014/0060086 | A1* | 3/2014 | Ranalli | B60H 1/00478 62/3.3 |
| 2014/0138049 | A1 | 5/2014 | Schroeder et al. | |
| 2015/0115048 | A1* | 4/2015 | Brodie | B60H 1/00764 237/2 B |
| 2015/0128632 | A1* | 5/2015 | Kishita | B60H 1/00271 62/324.6 |
| 2015/0183296 | A1* | 7/2015 | Ragazzi | B60H 1/03 219/205 |
| 2015/0210141 | A1* | 7/2015 | Ragazzi | B60H 1/00907 62/93 |
| 2015/0273980 | A1* | 10/2015 | Noda | F25B 5/04 62/324.1 |
| 2015/0308719 | A1* | 10/2015 | Gebbie | B60H 1/00921 62/71 |
| 2015/0314669 | A1* | 11/2015 | Noda | F25B 25/005 62/324.1 |
| 2016/0137031 | A1* | 5/2016 | Noda | B60H 1/03 165/203 |
| 2016/0137032 | A1* | 5/2016 | Kuroda | B60H 1/08 165/104.32 |
| 2016/0159203 | A1* | 6/2016 | Kuroda | F25B 5/02 62/160 |
| 2016/0209092 | A1* | 7/2016 | Kuroda | F25B 29/00 |
| 2016/0370037 | A1* | 12/2016 | Morimoto | B60H 1/32 |
| 2017/0036513 | A1* | 2/2017 | Kodera | B60H 1/00899 |
| 2017/0072771 | A1* | 3/2017 | Watanabe | B60H 1/00521 |
| 2017/0203635 | A1* | 7/2017 | Kuroda | B60H 1/00342 |
| 2017/0217286 | A1* | 8/2017 | Tsukamoto | B60H 1/22 |
| 2017/0217287 | A1* | 8/2017 | Kuroda | B60H 1/03 |
| 2017/0326947 | A1* | 11/2017 | Sakamoto | B60H 1/00342 |
| 2018/0117990 | A1* | 5/2018 | Kim | B60H 1/00278 |
| 2018/0117991 | A1* | 5/2018 | Kim | B60H 1/00392 |
| 2018/0141410 | A1* | 5/2018 | Kami | B60H 1/22 |
| 2018/0297445 | A1* | 10/2018 | Onishi | B60H 1/00892 |
| 2018/0361825 | A1* | 12/2018 | Porras | B60H 1/00385 |
| 2020/0101819 | A1* | 4/2020 | Yamada | B60H 1/22 |
| 2020/0122545 | A1* | 4/2020 | Lee | B60H 3/02 |
| 2020/0223288 | A1* | 7/2020 | Srivastava | B60H 1/00878 |

FOREIGN PATENT DOCUMENTS

| | | | | |
|---|---|---|---|---|
| DE | 102010051471 A1 | 5/2012 | | |
| DE | 102012024080 A1 | 3/2014 | | |
| DE | 102014111971 A1 * | 2/2016 | .......... | B60H 1/3204 |
| EP | 2098392 A1 | 9/2009 | | |
| JP | 2000335230 A * | 12/2000 | ........ | B60H 1/00478 |
| JP | 2009208619 A | 9/2009 | | |
| JP | 2010159006 A | 7/2010 | | |
| JP | 2010159008 A | 7/2010 | | |
| JP | 2013001160 A | 1/2013 | | |
| JP | 2013052877 A | 3/2013 | | |

* cited by examiner

FIG. 3

| | VEHICLE AIR CONDITIONER ACCORDING TO FIRST EMBODIMENT | COMPARATIVE AIR CONDITIONER |
|---|---|---|
| AMOUNT OF HEAT DISSIPATED FROM ENGINE TO AIR | SMALL | LARGE |
| TEMPERATURE OF EXHAUST GAS | LOW | HIGH |
| TEMPERATURE OF COOLANT INTRODUCED INTO ENGINE | ABOUT 50°C | ABOUT 55°C |
| TEMPERATURE OF COOLANT DISCHARGED FROM ENGINE | ABOUT 56°C | ABOUT 60°C |
| AMOUNT OF HEAT THAT COOLANT ABSORBS FROM ENGINE | LARGE | SMALL | ns.

AIR CONDITIONER FOR VEHICLE

CROSS REFERENCE TO RELATED APPLICATIONS

This application is a U.S. National Phase Application under 35 U.S.C. 371 of International Application No. PCT/JP2015/002261 filed on Apr. 27, 2015 and published in Japanese as WO 2015/174035 A1 on Nov. 19, 2015. This application is based on and claims the benefit of priority from Japanese Patent Application No. 2014-099635 filed on May 13, 2014. The entire disclosures of all of the above applications are incorporated herein by reference.

FIELD OF THE INVENTION

The present disclosure relates to a vehicle air conditioner for heating the interior of a vehicle using, as a heat source, a coolant in an internal combustion engine that outputs a driving force necessary to move the vehicle.

BACKGROUND ART

Conventionally, a vehicle air conditioner for performing heat exchange between a coolant in an engine (an internal combustion engine), which outputs the driving force necessary to move a vehicle, and ventilation air to be blown into the interior of the vehicle to heat the ventilation air and discharging the heated ventilation air into the interior of the vehicle, thereby heating the interior of the vehicle, is well known. Patent Document 1 discloses a vehicle air conditioner applied to a vehicle having an engine that is intermittently operated.

As the vehicle in which the engine is intermittently operated, for example, there are an idle stop vehicle in which an engine is stopped in an idling state in order to improve vehicle fuel efficiency and a hybrid vehicle in which the driving force necessary to move the vehicle is obtained both from an engine and from an electric motor.

In the vehicle in which the engine is intermittently operated, the temperature of the coolant is not increased in a state in which the engine is stopped. As a result, the temperature of the coolant may be lower than the temperature (specifically, a temperature of 55° C. or higher) necessary to appropriately heat the interior of the vehicle. For this reason, ventilation air may not be sufficiently heated at the time of heating the interior of the vehicle, whereby the sense of heating that is provided to each occupant may be reduced.

For a vehicle air conditioner disclosed in Patent Document 1, in the case in which the temperature of ventilation air discharged to the interior of the vehicle at the time of heating the interior of the vehicle is equal to or lower than a reference temperature, a request for operating the engine is input to an engine control device even when it is not necessary for the engine to output driving force necessary to move the vehicle. As a result, the engine is operated, the temperature of the coolant is prevented from being lower than the temperature necessary to heat the interior of the vehicle, and therefore a sense of heating that is provided to each occupant is reduced.

CITATION LIST

Patent Document

[Patent Document 1]
Japanese Unexamined Patent Application Publication No. 2009-208619

SUMMARY OF INVENTION

However, in the case in which the engine is operated in order to increase the temperature of the coolant when it is not necessary for the engine to output driving force necessary to move the vehicle, as in the vehicle air conditioner disclosed in Patent Document 1, vehicle fuel efficiency is reduced.

The present disclosure has been made in view of the above matter, and it is an object of the present disclosure to provide an air conditioner for a vehicle, for heating the interior of the vehicle using, as a heat source, a coolant in an internal combustion engine that outputs the driving force necessary to move the vehicle, in which the reduction of vehicle fuel efficiency (fuel mileage) is prevented and the reduction in the sense of heating that is provided to each occupant is prevented.

An air conditioner for a vehicle according to an aspect of the present disclosure includes: a water circulation circuit circulating a coolant that cools an internal combustion engine for outputting driving force necessary to move a vehicle; and a heating heat exchanger disposed in the water circulation circuit, and performing heat exchange between the coolant heated by the internal combustion engine and ventilation air to be blown to an interior of the vehicle to heat the ventilation air.

Furthermore, the air conditioner is provided with a heat transport unit that absorbs heat from a downstream coolant flowing through a coolant channel in the water circulation circuit from a coolant outlet side of the heating heat exchanger to a coolant inlet side of the internal combustion engine, and dissipates the heat absorbed from the downstream coolant to an upstream coolant flowing through a coolant channel in the water circulation circuit from a coolant outlet side of the internal combustion engine to a coolant inlet side of the heating heat exchanger.

According to the present disclosure, the heat transport unit is provided. Thus, even when the temperature of the coolant discharged from the internal combustion engine is not sufficiently increased, the temperature of the upstream coolant introduced into the heating heat exchanger may be increased until the temperature of the upstream coolant reaches the temperature necessary to appropriately heat the interior of the vehicle.

Consequently, ventilation air to be blown to the interior of the vehicle may be sufficiently heated by the heating heat exchanger, whereby the reduction in the sense of heating that is provided to each occupant may be prevented.

When it is not necessary to output driving force necessary to move the vehicle, the internal combustion engine is not operated for the purpose of increasing the temperature of the upstream coolant. Even when fuel is consumed in order to operate the heat transport unit, therefore, the reduction of vehicle fuel efficiency (deterioration of vehicle fuel efficiency) may be prevented generally.

More specifically, the heat transport unit absorbs heat from the downstream coolant. In the case in which the downstream coolant discharged from the heating heat exchanger is directly introduced into the internal combustion engine, therefore, the temperature of the downstream coolant introduced into the internal combustion engine may be decreased. As a result, the temperature difference between the internal combustion engine and the coolant introduced into the internal combustion engine may be increased, whereby waste heat of the internal combustion engine may be efficiently absorbed by the coolant.

Consequently, the efficiently absorbed heat may be used to heat the interior of the vehicle even when fuel is consumed as the result of operating the heat transport unit, whereby the reduction of vehicle fuel efficiency may be prevented generally.

That is, according to the above aspect of the present disclosure, in the vehicle air conditioner for heating the interior of the vehicle using the coolant in the internal combustion engine as the heat source, the reduction of vehicle fuel efficiency may be prevented, and the reduction in the sense of heating that is provided to each occupant may be prevented. In other words, a vehicle air conditioner capable of preventing the reduction in the sense of heating that is provided to each occupant without the reduction of vehicle fuel efficiency may be provided.

The vehicle fuel efficiency, which is the ratio of the travel distance of the vehicle to the amount of fuel that is consumed by the internal combustion engine, may be expressed as the travel distance per unit of fuel consumed. Consequently, in the case in which the internal combustion engine is operated in order to increase the temperature of the coolant when it is not necessary to output driving force necessary to move the vehicle, vehicle fuel efficiency is reduced.

In the vehicle air conditioner according to the above characteristic example, the heating heat exchanger may have a plurality of heat exchange parts arranged in series in the direction in which the ventilation air flows, a leeward heat exchange part, disposed the furthest downstream of the ventilation air flow, and a windward heat exchange part, disposed further upstream of the ventilation air flow than the leeward heat exchange part, may be provided as the heat exchange parts, and the water circulation circuit may be configured to introduce the upstream coolant heated by the heat transport unit into the leeward heat exchange part.

According to the present disclosure, the temperature of the upstream coolant introduced into the leeward heat exchange part may become higher than the temperature of the upstream coolant introduced into the windward heat exchange part. Consequently, the temperature difference between the coolant and ventilation air in both heat exchange parts may be secured, whereby heat exchange between the coolant and the ventilation air may be efficiently performed.

In the vehicle air conditioner according to the above characteristic example, specifically, the heat transport unit may be constituted by a vapor-compression refrigeration cycle device or a Peltier element.

BRIEF DESCRIPTION OF DRAWINGS

FIG. 3 is a table showing the difference between the vehicle air conditioner according to the first embodiment and a comparative air conditioner.

DESCRIPTION OF EMBODIMENTS

First Embodiment

Figure 1:
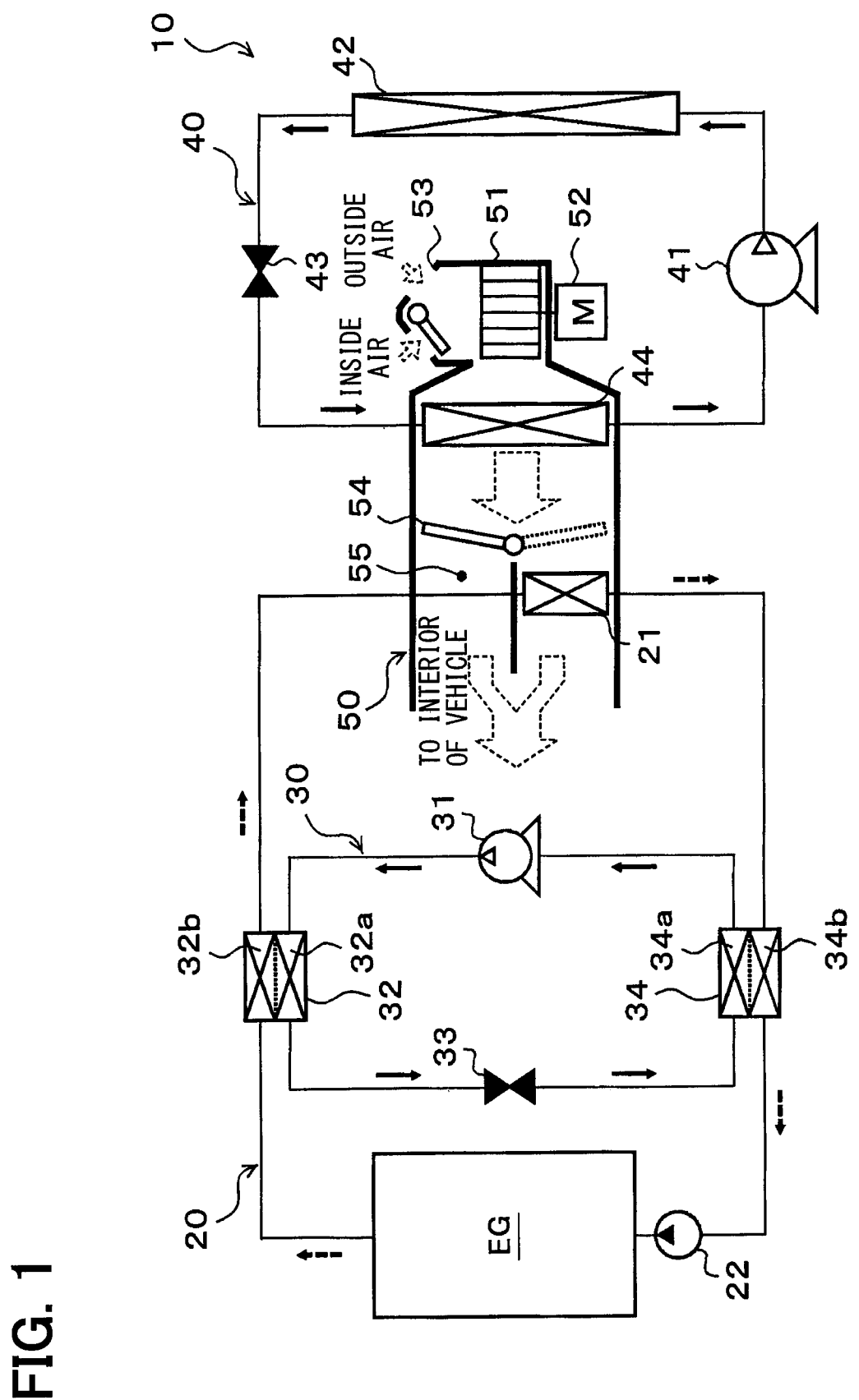
FIG. 1 is a view showing the overall construction of a vehicle air conditioner according to a first embodiment.

A first embodiment of the present disclosure will be described with reference to FIGS. 1 to 4. In the present embodiment, a vehicle air conditioner 10 according to the present disclosure is applied to a hybrid vehicle that obtains driving force necessary to move the vehicle from both an internal combustion engine (engine) EG and a travel electric motor.

The hybrid vehicle of the present embodiment may perform switching between a travel mode (an HV travel mode) of intermittently operating the engine EG in response to a travel load of the vehicle to obtain driving force from both the engine EG and the travel electric motor and a travel mode (an EV travel mode) of stopping the engine EG to obtain driving force from only the travel electric motor.

As the result of switching between the travel modes, vehicle fuel efficiency is improved more than in a general vehicle that obtains driving force necessary to move the vehicle from only the engine. The vehicle fuel efficiency, which is the ratio of the travel distance of the vehicle to the amount of fuel that is consumed by the engine, may be expressed as the travel distance per unit of fuel consumed.

In the hybrid vehicle of the present embodiment, the driving force output from the engine EG is used not only to move the vehicle but also to drive a generator (not shown). Electric power generated by the generator is accumulated in an electrical storage device (a battery), such as a lithium ion battery, so as to be supplied to various kinds of electric equipment constituting the travel electric motor and the vehicle air conditioner 10.

In the hybrid vehicle of the present embodiment, a gasoline engine, the operation of which is controlled according to a control signal output from an engine control device 70, which will be described hereinafter, is used as the engine EG. The engine EG is an in-vehicle device that generates heat during the operation thereof. In the vehicle air conditioner 10 according to the present embodiment, therefore, ventilation air to be blown to the interior of the vehicle is heated using waste heat of the engine EG.

Next, the construction of the vehicle air conditioner 10 according to the present embodiment will be described in detail. The vehicle air conditioner 10 includes a water circulation circuit 20, a heat transport refrigeration cycle device 30, a cooling refrigeration cycle device 40, an indoor air conditioning unit 50, and an air conditioning control device 60.

The water circulation circuit 20 is a circuit for circulating coolant in the engine in order to heat ventilation air. An anti-freeze containing an ethylene glycol solution may be used as the coolant. In the water circulation circuit 20 are disposed a heater core 21, a water circulation pump 22, a water passage 32b of a heat-dissipation water-refrigerant heat exchanger (i.e., water-refrigerant heat exchanger for heat dissipation) 32 of the heat transport refrigeration cycle device 30, which will be described hereinafter, and a water passage 34b of an evaporation water-refrigerant heat exchanger 34 (i.e., water-refrigerant heat exchanger for evaporation) of the heat transport refrigeration cycle device 30.

The heater core 21 is a heating heat exchanger that is disposed in a casing 51 of the indoor air conditioning unit 50, which will be described hereinafter, to perform heat exchange between the coolant heated by waste heat from the engine EG and ventilation air, thereby heating the ventilation air. The outlet side of the water passage 32b of the heat-dissipation water-refrigerant heat exchanger 32 is connected to the coolant inlet side of the heater core 21. The inlet side of the water passage 34b of the evaporation water-refrigerant heat exchanger 34 is connected to the coolant outlet side of the heater core 21.

The water circulation pump 22 is an electric water pump for suctioning the cooling water discharged from the water passage 34b of the evaporation water-refrigerant heat exchanger 34 at a position downstream of the heater core 21 and transferring the suctioned cooling water to a coolant channel defined in the engine EG. The rate of rotation (the water transfer capacity) of the water circulation pump 22 is controlled according to a control signal output from the engine control device 70.

When the engine control device 70 operates the water circulation pump 22, the coolant is circulated in the order of the water circulation pump 22→the coolant channel defined in the engine EG→the water passage 32b of the heat-dissipation water-refrigerant heat exchanger 32→the heater core 21→the water passage 34b of the evaporation water-refrigerant heat exchanger 34→water circulation pump 22. In FIG. 1, which shows the overall construction of the vehicle air conditioner, dashed line arrows shown around the water circulation circuit 20 indicate the direction in which the coolant flows.

In the present embodiment, therefore, the coolant flowing in the coolant channel of the water circulation circuit 20 from the coolant outlet side of the engine EG to the coolant inlet side of the heater core 21 corresponds to an upstream coolant recited in the claims. The coolant flowing in the coolant channel of the water circulation circuit 20 from the coolant outlet side of the heater core 21 to the coolant inlet side of the engine EG corresponds to a downstream coolant recited in the claims.

In the water circulation circuit 20 of the present embodiment are disposed a radiator (not shown), a coolant bypass passage (not shown), and a thermostat valve (not shown). The radiator is a heat dissipation heat exchanger for performing heat exchange between the coolant and outdoor air (outside air) to cool the coolant. The radiator is connected in parallel to at least the heater core 21.

The coolant bypass passage is a passage for allowing the coolant to flow by a roundabout route. The thermostat valve is a coolant circuit switching device that, when the temperature of the coolant flowing in the thermostat valve is equal to or lower than a reference switching temperature (90° C. in the present embodiment), performs switching from a coolant circuit for introducing the coolant to the radiator to a coolant circuit for introducing the coolant to the coolant bypass passage.

In the present embodiment, the thermostat valve performs switching between the coolant circuits, as described above, such that the temperature of the coolant during the operation of the engine EG is maintained within a predetermined reference temperature range (generally 85° C. to 95° C. in the present embodiment), as will be described hereinafter.

In the engine control device 70 of the present embodiment, warm-up control is performed to intermittently operate the engine EG such that the temperature of the engine EG is equal to or higher than a reference warm-up temperature KTw (specifically, 50° C.) irrespective of a travel state, as will be described hereinafter. In the present embodiment, therefore, the temperature of the engine EG is maintained equal to or higher than the reference warm-up temperature even when the engine EG does not need to output driving force necessary to move the vehicle.

The heat transport refrigeration cycle device 30 is a heat transport unit for moving heat contained in the coolant from the low temperature side to the high temperature side in the water circulation circuit 20. More specifically, the heat transport refrigeration cycle device 30 is a vapor-compression refrigeration cycle including a heat transport compressor 31, a heat-dissipation water-refrigerant heat exchanger 32, a fixed heat transport diaphragm 33, and an evaporation water-refrigerant heat exchanger 34.

The heat transport compressor 31 compresses and discharges the refrigerant in the heat transport refrigeration cycle device 30. The heat transport compressor 31 is an electric compressor for driving a fixed-capacity type compression mechanism having a fixed discharge capacity using an electric motor. Specifically, various compression mechanisms, such as a scroll type compression mechanism and a vane type compression mechanism, may be used as the fixed-capacity type compression mechanism.

The rate of rotation of the electric motor is controlled according to a control signal output from the air conditioning control device 60. An alternating current motor or a direct current motor may be used as the electric motor. The rate of rotation of the electric motor is controlled so as to change the refrigerant discharge capacity of the compressor 31. The inlet side of a refrigerant passage 32a of the heat-dissipation water-refrigerant heat exchanger 32 is connected to the discharge port of the heat transport compressor 31.

The heat-dissipation water-refrigerant heat exchanger 32 has a refrigerant passage 32a for allowing high-pressure refrigerant discharged from the heat transport compressor 31 to flow therethrough and a water passage 32b for allowing the upstream coolant of the coolant circulating in the water circulation circuit 20 to flow therethrough. The heat-dissipation water-refrigerant heat exchanger 32 performs heat exchange between the high-pressure refrigerant flowing through the refrigerant passage 32a and the upstream coolant flowing through the water passage 32b to heat the upstream coolant.

The heat-dissipation water-refrigerant heat exchanger 32 may be configured as follows. The water passage 32b may be disposed at the outer circumference of the refrigerant passage 32a. Alternatively, a serpentine type tube or a plurality of tubes for allowing the refrigerant to flow therethrough may be used as the refrigerant passage 32a, the water passage 32b may be disposed between adjacent tubes, and a corrugated fin or a plate fin for accelerating heat exchange between the refrigerant and the coolant may be provided.

In the present embodiment, an opposite flow type heat exchanger, which is configured such that the direction in which the refrigerant flowing through the refrigerant passage 32a and the direction in which the hot water flowing through the water passage 32b are opposite each other, is used as the heat-dissipation water-refrigerant heat exchanger 32. The inlet side of the fixed heat transport diaphragm 33 is connected to the outlet side of the refrigerant passage 32a of the heat-dissipation water-refrigerant heat exchanger 32.

The fixed heat transport diaphragm 33 is a heat transport decompression device for decompressing the refrigerant discharged from the refrigerant passage 32a. A nozzle having a fixed aperture, an orifice, or a capillary tube may be used as the fixed heat transport diaphragm 33. The inlet side of a refrigerant passage 34a of the evaporation water-refrigerant heat exchanger 34 is connected to the outlet side of the fixed heat transport diaphragm 33.

The evaporation water-refrigerant heat exchanger 34 has a refrigerant passage 34a for allowing low-pressure refrigerant, decompressed by the fixed heat transport diaphragm 33, to flow therethrough and a water passage 34b for allowing the downstream coolant of the coolant circulating in the water circulation circuit 20 to flow therethrough. The evaporation water-refrigerant heat exchanger 34 performs heat exchange between the low-pressure refrigerant flowing through the refrigerant passage 34a and the downstream coolant flowing through the water passage 34b to evaporate the low-pressure refrigerant, thereby performing heat absorption.

The evaporation water-refrigerant heat exchanger 34 may have the same construction as the heat-dissipation water-refrigerant heat exchanger 32. The inlet side of the heat transport compressor 31 is connected to the outlet side of the refrigerant passage 34a of the evaporation water-refrigerant heat exchanger 34.

Consequently, the heat transport refrigeration cycle device 30 may dissipate heat absorbed from the downstream coolant when the refrigerant is evaporated using the evaporation water-refrigerant heat exchanger 34 to the upstream coolant using the heat-dissipation water-refrigerant heat exchanger 32.

The cooling refrigeration cycle device 40, which is a vapor-compression refrigeration cycle for cooling ventilation air, includes a cooling compressor 41, a radiator 42, a cooling expansion valve 43, and an evaporator 44.

The cooling compressor 41 compresses and discharges the refrigerant in the cooling refrigeration cycle device 40. The cooling compressor 41 is identical in basic construction to the heat transport compressor 31. In the present embodiment, a compressor having a greater discharge capacity than the heat transport compressor 31 is used as the cooling compressor 41. The refrigerant inlet side of the radiator 42 is connected to the discharge port of the cooling compressor 41.

The radiator 42 is a heat-dissipation heat exchanger disposed at the front side of the vehicle in an engine room for performing heat exchange between the high-pressure refrigerant discharged from the cooling compressor 41 and air outside the interior of the vehicle (outside air) blown by a ventilation fan (not shown) to cool the high-pressure refrigerant such that the high-pressure refrigerant is condensed. The ventilation fan is an electric blower, the rate of rotation of which (the amount of ventilation air that is blown by which) is controlled according to a control voltage output from the air conditioning control device 60. The inlet side of the cooling expansion valve 43 is connected to the refrigerant outlet side of the radiator 42.

The cooling expansion valve 43 is a cooling decompression device for decompressing the refrigerant discharged from the radiator 42. The cooling expansion valve 43 has a temperature detection part for detecting a degree of superheating of the refrigerant at the outlet side of the evaporator 44 based on the temperature and pressure of the refrigerant at the outlet side of the evaporator 44. The cooling expansion valve 43 is a temperature type expansion valve, the aperture of which is adjusted using a mechanical mechanism such that the degree of superheating of the refrigerant at the outlet side of the evaporator 44 is within a predetermined reference range. The refrigerant inlet side of the evaporator 44 is connected to the outlet side of the cooling expansion valve 43.

The evaporator 44 is a heat absorption heat exchanger, disposed in the casing 51 of the indoor air conditioning unit 50 for performing heat exchange between the low-pressure refrigerant decompressed by the cooling expansion valve 43 and the ventilation air to evaporate the low-pressure refrigerant, thereby performing heat absorption. The inlet side of the compressor 41 is connected to the refrigerant outlet side of the evaporator 44.

The indoor air conditioning unit 50 is configured by integrating various kinds of equipment for discharging the ventilation air, the temperature of which has been adjusted, to the interior of the vehicle. The indoor air conditioning unit 50 is disposed inside a dashboard (an instrument panel) located at the furthest forward position in the interior of the vehicle. More specifically, the indoor air conditioning unit 50 is configured to accommodate a blower 52, the evaporator 44 of the cooling refrigeration cycle device 40, and the heater core 21 of the water circulation circuit 20 in the casing 51, which defines the outer shell of the indoor air conditioning unit 50.

The casing 51 defines an air passage for allowing the ventilation air blown to the interior of the vehicle to flow therethrough. The casing 51 is made of a resin (for example, polypropylene) that exhibits a certain extent of elasticity and excellent strength. An inside and outside air switching device 53 for switchably introducing inside air (air inside the interior of the vehicle) and outside air (air outside the interior of the vehicle) into the casing 51 is disposed in the most upstream side of the casing 51.

The inside and outside air switching device 53 continuously adjusts the opening area of an inside air introduction port, through which inside air is introduced into the casing 51, and the opening area of an outside air introduction port, through which outside air is introduced into the casing 51, using an inside and outside air switching door to continuously change the ratio in air volume of the inside air to the outside air. The inside and outside air switching door is driven by an electric actuator that drives the inside and outside air switching door. The operation of the electric actuator is controlled according to a control signal output from the air conditioning control device 60.

A blower 52 for blowing air suctioned through the inside and outside air switching device 53 to the interior of the vehicle is disposed at the downstream side of the inside and outside air switching device 53. The blower 52 is an electric blower, a multi-blade centrifugal fan (a sirocco fan) of which is driven by an electric motor. The rate of rotation of the blower 52 (the amount of ventilation air that is blown by the blower 52) is controlled according to control voltage output from the air conditioning control device 60.

The evaporator 44 and the heater core 21 are disposed at the downstream side of the blower 52 such that the evaporator 44 and the heater core 21 are sequentially arranged in the direction in which the ventilation air flows. That is, the evaporator 44 is disposed at a farther upstream position than the heater core 21. In the casing 51 is defined a cold air bypass passage 55 for allowing the ventilation air, having passed through the evaporator 44, to go around the heater core 21 so as to flow downstream.

At the downstream side of the evaporator 44 and the upstream side of the heater core 21 is disposed an air mixing door 54 for adjusting the ratio in air volume of the air passing through the heater core 21 to the air passing through the cold air bypass passage 55.

At the downstream side of the heater core 21 is provided a mixing space for allowing the ventilation air heated by the heater core 21 and the ventilation air having passed through the cold air bypass passage 55 to be mixed therein. Open holes, through which the ventilation air (the air-conditioned air) mixed in the mixing space is blown to the interior of the vehicle, which is a space to be air conditioned, are disposed at the most downstream side of the casing 51.

Specifically, a face open hole (not shown), through which the air-conditioned air is blown toward the upper half of the body of each vehicle passenger in the interior of the vehicle, a foot open hole (not shown), through which the air-conditioned air is blown toward the feet of each vehicle passenger, and a defroster open hole (not shown), through which the air-conditioned air is blown toward the inside surface of a windshield of the vehicle are provided as the open holes.

The downstream sides of the face open hole, the foot open hole, and the defroster open hole are respectively connected to a face outlet port (not shown), a foot outlet port (not shown), and a defroster outlet port (not shown) provided in the interior of the vehicle via ducts defining air passages.

The air mixing door 54 adjusts the ratio in air volume of the air passing through the heater core 21 to the air passing through the cold air bypass passage 55. As a result, the temperature of the air-conditioned air mixed in the mixing space is adjusted, whereby the temperature of the ventilation air (the air-conditioned air) discharged from the respective air-outlet ports to the interior of the vehicle is adjusted.

That is, the air mixing door 54 constitutes a temperature adjustment device for adjusting the temperature of the air-conditioned air blown to the interior of the vehicle. The air mixing door 54 is driven by an electric actuator that drives the air mixing door. The operation of the electric actuator is controlled according to a control signal output from the air conditioning control device 60.

At the upstream sides of the face open hole, the foot open hole, and the defroster open hole are respectively disposed a face door (not shown) for adjusting the open area of the face open hole, a foot door (not shown) for adjusting the open area of the foot open hole, and a defroster door (not shown) for adjusting the open area of the defroster open hole.

The face door, the foot door, and the defroster door constitute an air outlet mode switching device (an air outlet mode door) for performing switching between air outlet modes. The face door, the foot door, and the defroster door are connected to an electric actuator that drives the air outlet mode door via a link mechanism (not shown) such that the face door, the foot door, and the defroster door are rotated together. The operation of the electric actuator is also controlled according to a control signal output from the air conditioning control device 60.

Specifically, the air outlet modes, switching between which is performed by the air outlet mode switching device, include a face mode for completely opening the face discharge port to discharge air toward the upper half of the body of each vehicle passenger in the interior of the vehicle from the face discharge port, a bi-level mode for opening both the face discharge port and the face discharge port to discharge air toward the upper half of the body of each vehicle passenger in the interior of the vehicle and toward the feet of each vehicle passenger, a foot mode for completely opening the foot discharge port and partially opening the defroster discharge port to discharge air mainly from the foot discharge port, and a foot and defroster mode for equally opening the foot discharge port and the defroster discharge port to discharge air from both the foot discharge port and the defroster discharge port.

A vehicle passenger may manually manipulate a discharge mode switching switch provided at a manipulation panel to execute a defroster mode for completely opening the defroster discharge port to discharge air to the inside surface of the windshield of the vehicle from the defroster discharge port.

Figure 2:
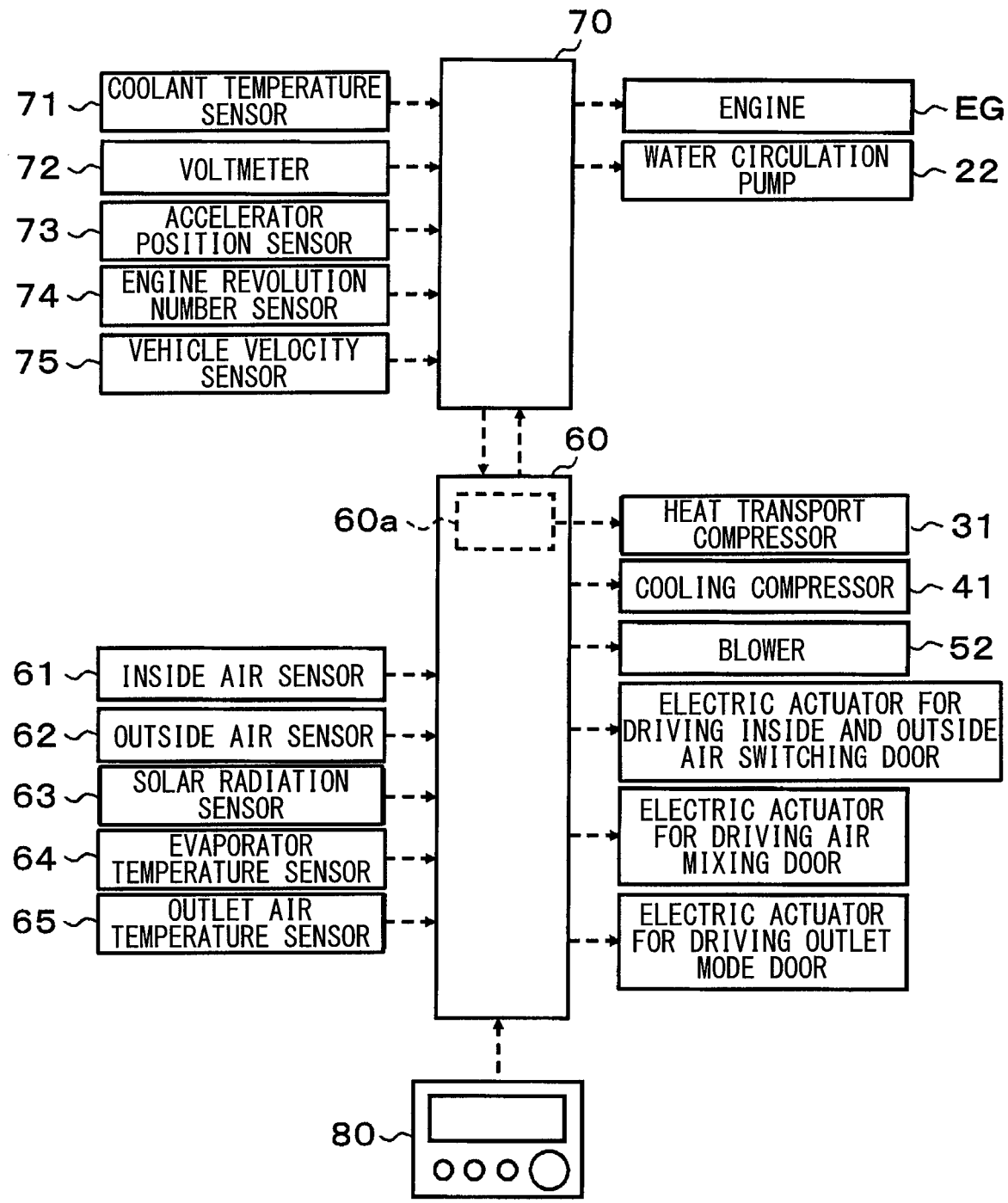
FIG. 2 is a block diagram showing an electric control unit of the vehicle air conditioner according to the first embodiment.

Next, an electric control unit of the present embodiment will be described with reference to FIG. 2. The engine control device 70 and the air conditioning control device 60 each include a well-known microcomputer, which includes a CPU, a ROM, and a RAM, and a peripheral circuit thereof. The engine control device and the air conditioning control device each perform various operations and processes based on a control program stored in the ROM, and control the operation of various kinds of equipment connected to the output side thereof.

In addition to the water circulation pump 22, various kinds of equipment constituting the engine EG are connected to the output side of the engine control device 70. Specifically, a starter for starting the engine EG and a circuit for driving a fuel injection valve (injector) for supplying fuel to the engine EG are connected to the output side of the engine control device 70.

A sensor group for controlling the engine EG, including a coolant temperature sensor 71 for detecting a coolant temperature Tw of the coolant discharged from the engine EG, a voltmeter 72 for detecting the voltage VB of the battery, an accelerator position sensor 73 for detecting the position Acc of an accelerator, an engine revolution number sensor 74 for detecting the rate of rotation Ne of the engine EG, and a vehicle velocity sensor 75 for detecting the velocity Vv of the vehicle, is connected to the input side of the engine control device 70.

The heat transport compressor 31, the cooling compressor 41, the blower 52, and various kinds of air conditioning control equipment, such as electric actuators for driving the inside and outside air switching door, the air mixing door, and the air outlet mode door, are connected to the output side of the air conditioning control device 60.

The air conditioning control device 60 is an integrated control device for controlling various kinds of air conditioning control equipment connected to the output side of the air conditioning control device 60; however, the construction (hardware and software) for controlling the operation of each piece of the air conditioning control equipment constitutes a control device for controlling the operation of each piece of the air conditioning control equipment.

For example, in the present embodiment, the construction for controlling the operation of the heat transport refrigeration cycle device 30 (specifically, the heat transport compressor 31) constitutes a heat transport controller 60a. Of course, a controller for controlling the operation of each piece of the air conditioning control equipment and the heat transport controller 60a may be configured as control devices separate from the air conditioning control device 60.

An air conditioning control sensor group, including an inside air sensor 61 for detecting the temperature Tr in the interior of the vehicle, an outside air sensor 62 for detecting the temperature Ta of outside air, a solar radiation sensor 63 for detecting the amount of solar radiation As in the interior of the vehicle, an evaporator temperature sensor 64 (an evaporator temperature detection unit) for detecting a refrigerant evaporation temperature (evaporator temperature) Tefin in the evaporator, and a discharge air temperature sensor 65 for detecting a discharged air temperature TAV of air discharged into the interior of the vehicle, is connected to the input side of the air conditioning control device 60.

A manipulation panel 80, which is disposed in the vicinity of the dashboard located at the front part in the interior of the vehicle, is also connected to the input side of the air conditioning control device 60. Manipulation signals from various air conditioning manipulation switches provided at the manipulation panel 80 are input to the air conditioning control device 60.

Specifically, an operation switch for enabling the vehicle air conditioner 10 to be operated or stopped, a temperature setting switch for setting a temperature Tset of the interior of the vehicle, an operation mode switching switch for performing switching between operation modes, an air outlet mode switch, and an air volume setting switch for setting the volume of air that is blown by the blower 52 are provided as the air conditioning manipulation switches.

The engine control device 70 and the air conditioning control device 60 of the present embodiment are electrically connected to each other so as to communicate with each other. As a result, one of the control devices may control the operation of various kinds of equipment connected to the output side thereof based on a detection signal or a manipulation signal input to the other of the control devices. Consequently, the engine control device 70 and the air conditioning control device 60 may be integrated into a single control device.

Next, the operation of the present embodiment with the above-stated construction will be described. First, basic control processing, which is executed by the engine control device 70, will be described.

When a vehicle starter switch is turned on to start the vehicle, the engine control device 70 calculates a travel load of the vehicle based on a detection signal from the engine control sensor group 71 to 75, and operates or stops the engine EG in response to the travel load. At the time of starting the vehicle, the engine control device 70 operates the water circulation pump 22 so as to achieve a predetermined water transfer capacity.

At the time of operating the engine EG, therefore, the coolant circulating in the water circulation circuit 20 absorbs waste heat of the engine EG to cool the engine EG while flowing through the coolant channel defined in the engine EG.

In the case in which the temperature of the coolant passing through the thermostat valve of the water circulation circuit 20 is higher than the reference switching temperature (90° C. in the present embodiment), the thermostat valve is switched to the coolant circuit for introducing the coolant to the radiator. As a result, the waste heat of the engine EG, which has been absorbed by the coolant, is dissipated to the air through the radiator.

In the case in which the temperature of the coolant passing through the thermostat valve of the water circulation circuit 20 is equal to or lower than the reference switching temperature, on the other hand, the thermostat valve is switched to the coolant circuit for introducing the coolant to the coolant bypass passage. As a result, the waste heat of the engine EG, which has been absorbed by the coolant, is not dissipated to the air through the radiator.

At the time of operating the engine EG, therefore, the thermostat valve performs switching between the coolant circuits such that the temperature of the coolant and the temperature of the engine EG are maintained within a predetermined reference temperature range (generally 85° C. to 95° C. in the present embodiment).

As a result, the temperature of the engine EG may be prevented from being excessively increased, whereby the engine EG may be prevented from being overheated. The temperature of the engine EG may be prevented from being excessively decreased, whereby friction loss may be prevented from being increased due to the increase in viscosity of engine oil, and an exhaust gas purification catalyst may be prevented from malfunctioning due to the decrease in the temperature of the exhaust gas.

At the time of stopping the engine EG, the engine EG may not generate heat, and the temperature of the coolant and the temperature of the engine EG may be excessively decreased due to the dissipation of heat from the engine EG.

In the engine control device 70 of the present embodiment, therefore, warm-up control is performed to operate the engine EG such that the coolant temperature Tw of the coolant detected by the coolant temperature sensor 71 becomes higher than a reference warm-up temperature KTw (specifically, 50° C.) even when it is not necessary to operate the engine EG in order to output driving force necessary to move the vehicle.

More specifically, in the warm-up control, the engine EG is operated until the coolant temperature Tw becomes about 2° C. higher than the reference warm-up temperature KTw when the coolant temperature Tw is lower than the reference warm-up temperature KTw. Consequently, the coolant temperature Tw is maintained equal to or higher than the reference warm-up temperature KTw.

As a result, the temperature of the engine EG may be prevented from being excessively decreased, whereby friction loss may be prevented from being increased when the engine EG is restarted, and the exhaust gas purification catalyst may be prevented from malfunctioning.

In order to prevent the increase of friction loss and the malfunction of the exhaust gas purification catalyst at the time of restarting the engine EG, the reference warm-up temperature KTw may be set to temperature higher than 50° C. In the case in which the reference warm-up temperature KTw is set to temperature higher than 50° C., however, frequency in which the engine EG is operated is increased when it is not necessary to operate the engine EG in order to output driving force necessary to move the vehicle.

The increase in operation frequency of the engine EG reduces vehicle fuel efficiency. In the warm-up control of the present embodiment, therefore, the reference warm-up temperature KTw is set to 50° C., at which the increase of friction loss and the malfunction of the exhaust gas purification catalyst are prevented at the time of restarting the engine and at which unnecessary reduction of vehicle fuel efficiency is prevented.

Next, the operation of the vehicle air conditioner 10 will be described. In the vehicle air conditioner 10 according to the present embodiment, switching between a cooling mode for discharging cooled ventilation air to the interior of the vehicle, a heating mode for discharging heated ventilation air to the interior of the vehicle, and a dehumidification and heating mode for reheating cooled and dehumidified ventilation air and discharging the reheated ventilation air to the interior of the vehicle may be performed based on a manipulation signal from the operation mode switching switch of the manipulation panel 80. Hereinafter, the operation in each of the operation modes will be described.

(a) Cooling Mode

The cooling mode is executed when the cooling mode is selected using the operation mode switching switch in the state in which the operation switch of the manipulation panel 80 is turned ON. In the cooling mode, the air conditioning control device 60 reads a detection signal from the air conditioning control sensor group 61 to 65 and a manipulation signal from the manipulation panel 80. The air conditioning control device 60 calculates a target discharge temperature TAO, which is the target temperature of air that is discharged to the interior of the vehicle, based on the values of the read detection signal and the read manipulation signal.

Specifically, the target discharge temperature TAO is calculated using Equation F1 below.

$$TAO = Kset \times Tset - Kr \times Tr - Kam \times Tam - Ks \times As + C \quad (F1)$$

where Tset is a set temperature in the interior of the vehicle, set using the temperature setting switch of the manipulation panel 80, Tr is the temperature in the interior of the vehicle (temperature of inside air) detected by the inside air sensor 61, Tam is the temperature of outside air detected by the outside air sensor 62, and As is the amount of solar radiation detected by the solar radiation sensor 63. Kset, Kr, and Kam, and Ks are control gains, and C is a correction constant.

The air conditioning control device 60 determines the control signal that is to be output to various kinds of air conditioning control equipment connected to the output side of the air conditioning control device 60 based on the calculated target discharge temperature TAO and the calculated detection signal of the air conditioning control sensor group 61 to 65.

For example, a control signal that is output to the electric motor of the cooling compressor 41 of the cooling refrigeration cycle device 40 is decided as follows.

First, a target evaporator discharge temperature TEO of the evaporator 44 is determined based on the target discharge temperature TAO while referring to a control map stored in advance in the air conditioning control device 60. The target evaporator discharge temperature TEO is determined so as to decrease in response to the decrease of the target discharge temperature TAO such that the discharge air temperature TAV approaches the target discharge temperature TAO.

A control signal that is output to the electric motor of the cooling compressor 41 is determined based on the difference between the target evaporator discharge temperature TEO and the evaporator temperature Tefin detected by the evaporator temperature sensor 64 using a feedback control method such that the evaporator temperature Tefin approaches the evaporator discharge temperature TEO.

The control voltage (blower motor voltage) that is output to the electric motor of the blower 52 is determined so as to have approximately the maximum value in an ultralow temperature zone (the maximum cooling zone) and an ultrahigh temperature zone (the maximum heating zone) of TAO. The blower motor voltage is determined so as to gradually decrease from the maximum value as TAO approaches a middle temperature zone from the ultralow temperature zone or the ultrahigh temperature zone.

The control signal that is output to the electric actuator that drives the air mixing door 54 is determined such that the air mixing door 54 closes the air passage on the heater core 21 side and allows all of the ventilation air that has passed through the evaporator 44 to pass through the cold air bypass passage 55.

The control signal that is output to the electric actuator that drives the inside and outside air switching door is determined such that an inside air mode for introducing inside air is executed in the case in which TAO approaches the ultralow temperature zone, whereby high cooling performance may be obtained, although an outside air mode for introducing outside air has priority.

The control signal that is output to the electric actuator that drives the air outlet mode door is determined such that the air outlet mode is sequentially switched in the order of the foot mode→the bi-level mode→the face mode as TAO is increased from the low temperature zone to the high temperature zone. Consequently, the face mode is mainly selected in summer, the bi-level mode is mainly selected in spring and fall, and the foot mode is mainly selected in winter.

The control signal that is output to the electric motor of the heat transport compressor 31 of the heat transport refrigeration cycle device 30 is determined so as to stop the operation of the heat transport compressor 31.

The control signals determined as described above are output to various kinds of air conditioning control equipment. Subsequently, a control routine, including reading of the detection signal and the manipulation signal→calculation of the target discharge temperature TAO→decision of states of operation of various kinds of air conditioning control equipment→output of the control voltage and the control signal, is repeated for every predetermined control period until the operation of the vehicle air conditioner 10 is required to be stopped by the manipulation panel. In the remaining operation modes, the control routine is repeated in the same manner.

In the cooling mode, therefore, ventilation air (cold air) cooled by the evaporator 44 of the cooling refrigeration cycle device 40 is discharged to the interior of the vehicle via the cold air bypass passage 55, the mixing space, and the respective discharge ports. As a result, the interior of the vehicle is cooled.

(b) Heating Mode

The heating mode is executed when the heating mode is selected using the operation mode switching switch in a state in which the operation switch of the manipulation panel 80 is turned ON. In the heating mode, the air conditioning control device 60 determines the control signal or control voltage that is output to various kinds of air conditioning control equipment based on a target discharge temperature TAO and a detection signal from the air conditioning control sensor group 61 to 65 in the same manner as in the cooling mode.

For example, a control signal that is output to the electric motor of the cooling compressor 41 is determined so as to stop the operation of the cooling compressor 41. The control signal that is output to the electric actuator that drives the air mixing door 54 is decided using a feedback control method such that a discharge air temperature TAV, detected by the discharge air temperature sensor 65, approaches the target discharge temperature TAO. The same mode as the cooling mode is applied to the other pieces of the air conditioning control equipment.

In the heating mode, therefore, ventilation air (hot air) heated by the heater core 21 and ventilation air having passed through the cold air bypass passage 55 are mixed in the mixing space, and air conditioning air, the temperature of which has been adjusted so as to approach the target discharge temperature TAO, is discharged to the interior of the vehicle through the respective discharge ports. As a result, the interior of the vehicle is heated.

(c) Dehumidification and Heating Mode

The dehumidification and heating mode is executed when the dehumidification and heating mode is selected using the operation mode switching switch in the state in which the operation switch of the manipulation panel 80 is turned ON. In the dehumidification and heating mode, the air conditioning control device 60 determines the control signal or control voltage that is output to various kinds of air conditioning control equipment based on a target discharge temperature TAO and a detection signal from the air conditioning control sensor group 61 to 65 in the same manner as in the cooling mode and the heating mode.

For example, the control signal that is output to the electric motor of the cooling compressor 41 is determined such that the evaporator temperature Tefin becomes equal to or higher than a predetermined reference evaporator temperature (specifically, 1° C.). The reference evaporator temperature is set such that no frost forms on the evaporator 44. The same mode as the heating mode is applied to the other pieces of the air conditioning control equipment.

In the dehumidification and heating mode, therefore, ventilation air (cold air) cooled and dehumidified by the evaporator 44 is reheated by the heater core 21. The reheated ventilation air (hot air) and ventilation air (cold air) having passed through the cold air bypass passage 55 are mixed in the mixing space, and air conditioning air, the temperature of which has been adjusted so as to approach the target discharge temperature TAO, is discharged to the interior of the vehicle through the respective discharge ports. As a result, the interior of the vehicle is dehumidified and heated.

As described above, in the vehicle air conditioner 10 according to the present embodiment, the interior of the vehicle may be cooled, heated, or dehumidified and heated.

In the vehicle air conditioner 10 according to the present embodiment, ventilation air is heated using the coolant in the engine EG as a heat source at the time of heating the interior of the vehicle and at the time of dehumidifying and heating the interior of the vehicle. According to the above construction, in the case in which the temperature of the coolant that is introduced into the heater core 21 does not become equal to or higher than the temperature necessary to heat the interior of the vehicle or to dehumidify and heat the interior of the vehicle at the time of heating the interior of the vehicle and at the time of dehumidifying and heating the interior of the vehicle, the ventilation air that is discharged to the interior of the vehicle may not be sufficiently heated, whereby the sense of heating that is provided to each occupant may be reduced.

The inventors of the present application have found that it is necessary to increase the temperature of the coolant that is introduced into the heater core 21 to at least 55° C. in order to sufficiently heat or dehumidify and heat the interior of the vehicle.

In the warm-up mode of the engine control device 70 of the present embodiment, however, the engine EG is operated such that the coolant temperature Tw becomes approximately the reference warm-up temperature KTw (specifically, 50° C.), as described above. For this reason, the sense of heating that is provided to each occupant may be reduced in the case in which the interior of the vehicle is heated or dehumidified and heated during execution of the warm-up control.

In contrast, the reference warm-up temperature KTw at the time of the warm-up control may be set to about 60° C. In the case in which the reference warm-up temperature KTw is increased from 50° C. to about 60° C., however, frequency in which the engine EG is operated is increased, whereby vehicle fuel efficiency is reduced, as described above.

In the vehicle air conditioner 10 according to the present embodiment, therefore, the operation is performed in a strong heating mode or in a strong dehumidification and heating mode when the coolant temperature Tw in the heating mode or in the dehumidification and heating mode is equal to or lower than the heating determination temperature KHTw. In the present embodiment, the heating determination temperature KHTw is set to 60° C., which is the temperature of the coolant that is necessary to sufficiently heat ventilation air such that the sense of heating that is provided to each occupant is not reduced.

In the strong heating mode or the strong dehumidification and heating mode, the heat transport controller 60a of the air conditioning control device 60 operates the heat transport compressor 31 of the heat transport refrigeration cycle device 30. More specifically, the heat transport controller 60a outputs, to the electric motor of the heat transport compressor 31, a control signal determined such that the temperature of the upstream coolant introduced into the heater core 21 becomes equal to or higher than the heating determination temperature KHTw.

In the strong heating mode or the strong dehumidification and heating mode, therefore, the high-pressure refrigerant discharged from the heat transport compressor 31 is introduced into the refrigerant passage 32a of the heat-dissipation water-refrigerant heat exchanger 32, and exchanges heat with the upstream coolant passing through the water passage 32b, whereby heat is dissipated from the refrigerant. As a result, the temperature of the upstream coolant introduced into the heater core 21 is heated to the heating determination temperature KHTw or higher.

The refrigerant discharged from the refrigerant passage 32a of the heat-dissipation water-refrigerant heat exchanger 32 is decompressed by the fixed heat transport diaphragm 33. The low-pressure refrigerant decompressed by the fixed heat transport diaphragm 33 is introduced into the refrigerant passage 34a of the evaporation water-refrigerant heat exchanger 34, and exchanges heat with the downstream coolant passing through the water passage 34b, whereby the refrigerant is evaporated. As a result, the temperature of the downstream coolant introduced into the engine EG becomes lower than in the heating mode or the dehumidification and heating mode.

The refrigerant discharged from the refrigerant passage 34a of the evaporation water-refrigerant heat exchanger 34 is suctioned into the heat transport compressor 31, by which the refrigerant is compressed again.

In the strong heating mode or the strong dehumidification and heating mode, as described above, the temperature of the upstream coolant introduced into the heater core 21 may be heated by the heat-dissipation water-refrigerant heat exchanger 32 so as to be equal to or higher than the heating determination temperature KHTw. Consequently, ventilation air may be sufficiently heated by the heater core 21, whereby the reduction in the sense of heating that is provided to each occupant may be prevented.

In the strong heating mode or the strong dehumidification and heating mode, the engine EG is not operated for the purpose of increasing the temperature of the upstream coolant introduced into the heater core 21 when it is not necessary to output driving force necessary to move the vehicle. Even when fuel is consumed in order to operate the heat transport refrigeration cycle device 30, therefore, the reduction of vehicle fuel efficiency may be prevented generally.

The strong heating mode or the strong dehumidification and heating mode will be described with reference to FIGS. 3 and 4 in comparison with a heating mode or a dehumidification and heating mode of an ordinary vehicle air conditioner (hereinafter, referred to as a comparative air conditioner) applied to a hybrid vehicle in which the reference warm-up temperature KTw in the warm-up control is set to 60° C.

First, in the hybrid vehicle to which the comparative air conditioner is applied, the temperature of the engine EG at the time of warm-up control is higher than in the hybrid vehicle of the present embodiment. For this reason, the temperature difference between the temperature of the engine EG and the temperate of outside air is increased, whereby the amount of heat that is dissipated from the engine EG to the air becomes large, as shown in a table of FIG. 3. The temperature of exhaust air is also increased, whereby the amount of heat that is dissipated to the air through the exhaust also becomes large.

This means that, in the hybrid vehicle in which the reference warm-up temperature KTw in the warm-up control is set to 60° C., the ratio of heat dissipated to the air to heat generated when the engine EG consumes fuel is higher than in the hybrid vehicle of the present embodiment.

On the other hand, in the strong heating mode or the strong dehumidification and heating mode of the vehicle air conditioner 10 according to the present embodiment, the temperature of the downstream coolant introduced into the engine EG and the upstream coolant discharged from the engine EG is lower than in the heating mode or the dehumidification and heating mode of the comparative air conditioner. For this reason, the temperature difference between the engine EG and the coolant is increased, whereby the amount of heat that the coolant absorbs from the engine EG becomes large.

That is, in the strong heating mode or the strong dehumidification and heating mode of the vehicle air conditioner 10 according to the present embodiment, the ratio of heat dissipated into the air to heat generated when the engine EG consumes fuel is lower than in the heating mode or the dehumidification and heating mode of the comparative air conditioner. The coolant may efficiently absorb waste heat from the engine EG.

Figure 4:
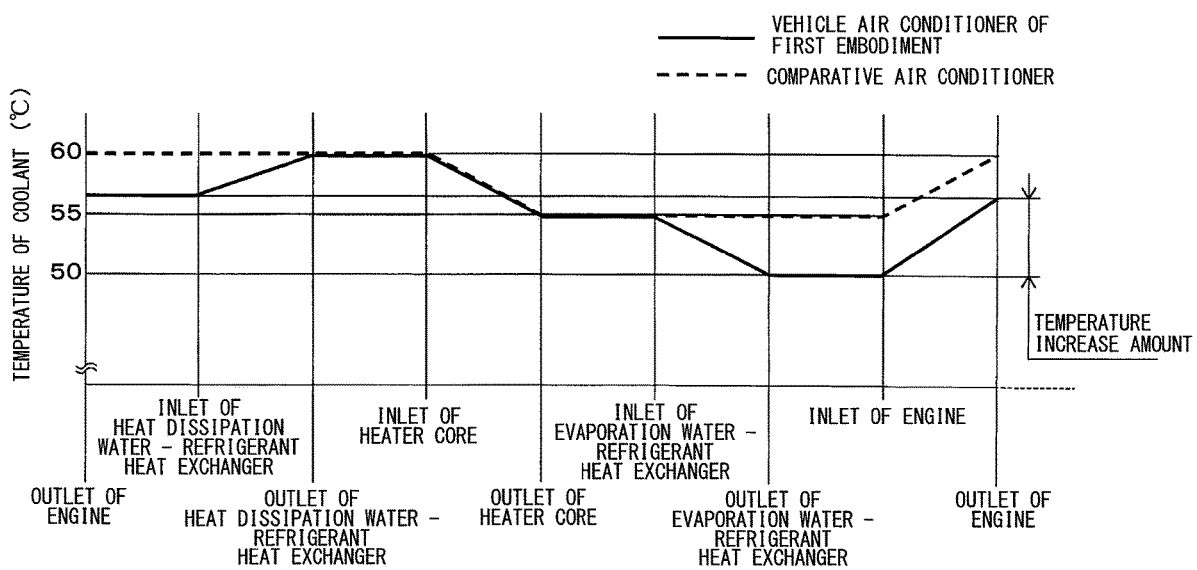
FIG. 4 is a view illustrating the change in temperature of a coolant in a water circulation circuit of the first embodiment.

As shown in FIG. 4, therefore, in the strong heating mode or the strong dehumidification and heating mode of the vehicle air conditioner 10 according to the present embodiment, the magnitude of the increase in temperature from the temperature of the coolant in the coolant inlet of the engine EG to the temperature of the coolant in the coolant outlet of the engine EG may be greater than in the heating mode or the dehumidification and heating mode of the comparative air conditioner.

As a result, the efficiently absorbed heat may be used to heat or dehumidify and heat the interior of the vehicle even when fuel is consumed in order to operate the heat transport refrigeration cycle device 30, whereby the reduction of vehicle fuel efficiency may be prevented generally.

That is, in the vehicle air conditioner 10 according to the present embodiment, the reduction of vehicle fuel efficiency may be prevented, and the reduction in the sense of heating that is provided to each occupant may be prevented. In other words, in the vehicle air conditioner 10 according to the present embodiment, the reduction in the sense of heating that is provided to each occupant may be prevented without the reduction of vehicle fuel efficiency.

The inventors of the present application have also found that the amount of electric power that is necessary to operate the heat transport compressor 31 of the heat transport refrigeration cycle device 30 in the strong heating mode or the strong dehumidification and heating mode is less than the amount of surplus electric power stored in the battery in the travel mode in which the engine EG is operated.

That is, the engine EG is substantially almost never operated in order to operate only the heat transport refrigeration cycle device 30, and vehicle fuel efficiency is only slightly reduced even when the heat transport refrigeration cycle device 30 is operated. In other words, in the vehicle air conditioner 10 according to the present embodiment, the surplus electric power stored in the battery may be effectively used in order to heat or humidify and heat the interior of the vehicle.

Second Embodiment

Figure 5:
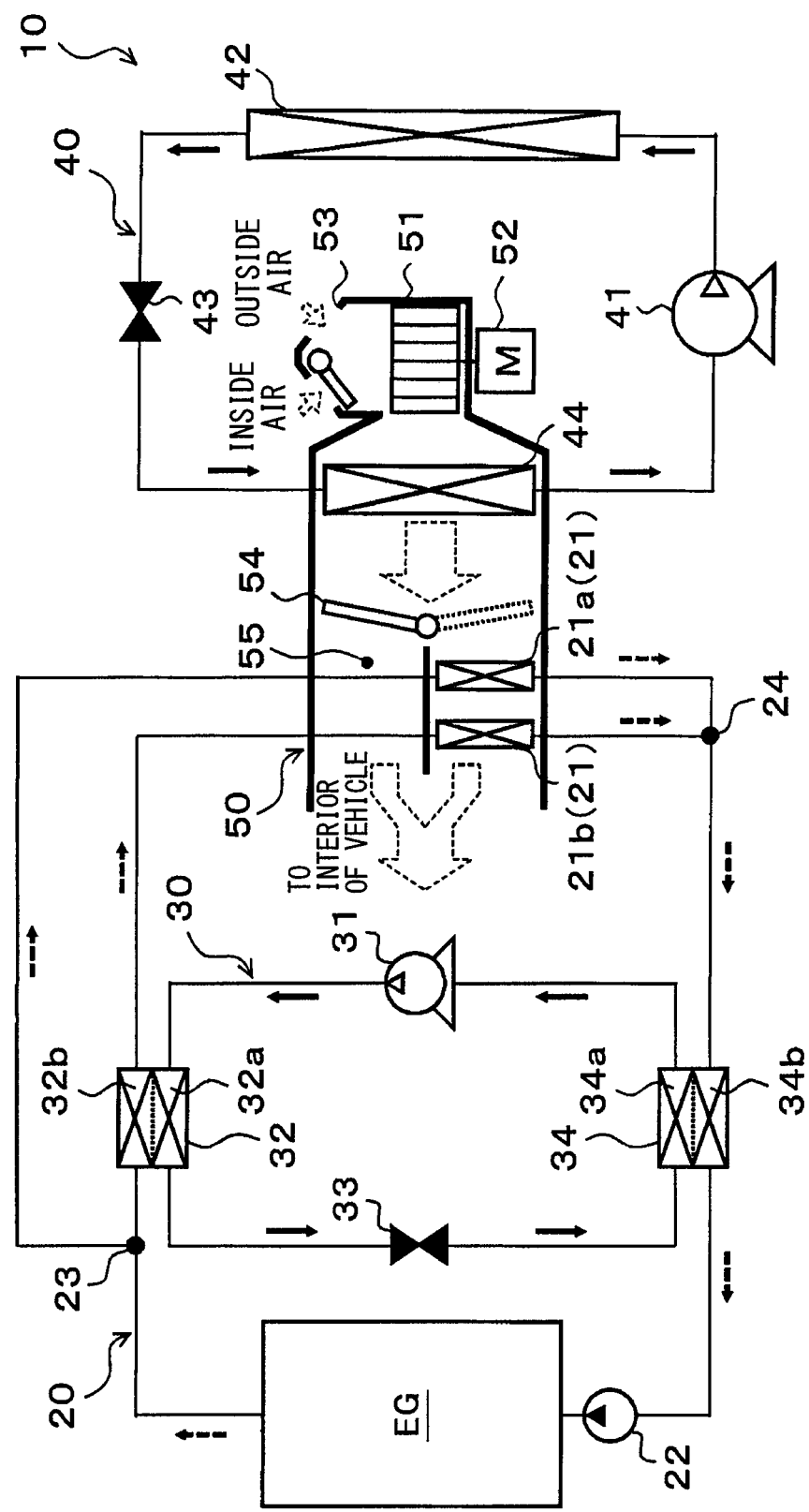
FIG. 5 is a view showing the overall construction of a vehicle air conditioner according to a second embodiment.

In the present embodiment, a description will be given of an example in which the construction of the water circulation circuit 20 and the heater core 21 is modified in the first embodiment, as shown in an overall construction view of FIG. 5. In FIG. 5, parts in the present embodiment that are identical to or similar to those in the first embodiment are denoted by the same reference numerals, which will be equally applied to subsequent drawings.

More specifically, the heater core 21 of the present embodiment has a plurality of (two in the present embodiment) heat exchange parts 21a and 21b, which are arranged in series in the direction in which ventilation air flows. In the present embodiment, one of the heat exchange parts, which is disposed at an upstream position in terms of ventilation air flow, is referred to as a windward heat exchange part 21a, and the other of the heat exchange parts, which is disposed at a downstream position in terms of ventilation air flow, is referred to as a leeward heat exchange part 21b.

In the water circulation circuit 20 of the present embodiment are disposed a branch part 23 for dividing the flow of the upstream coolant discharged from the engine EG and a confluence part 24 for joining the flow of the coolant discharged from the windward heat exchange part 21a with the flow of the coolant discharged from the leeward heat exchange part 21b.

The branch part 23 is constituted by a three-way joint having three introduction and discharge ports. One of the three introduction and discharge ports is a coolant introduction port, and the other two of the three introduction and discharge ports are coolant discharge ports. The three-way joint may be formed by joining pipes having different diameters or by providing a plurality of coolant passages in a metal block or a resin block.

The inlet side of the water passage 32b of the heat-dissipation water-refrigerant heat exchanger 32 is connected to one of the coolant discharge ports of the branch part 23. The coolant inlet side of the leeward heat exchange part 21b is connected to the outlet side of the water passage 32b of the heat-dissipation water-refrigerant heat exchanger 32. The coolant inlet side of the windward heat exchange part 21a is connected to the other of the coolant discharge ports of the branch part 23.

That is, the water circulation circuit 20 of the present embodiment is configured such that, when the heat transport refrigeration cycle device 30 is operated, the upstream coolant discharged from one of the coolant discharge ports of the branch part 23 is heated by the heat-dissipation water-refrigerant heat exchanger 32 and is then introduced into the leeward heat exchange part 21b, and the downstream coolant discharged from the other of the coolant discharge ports of the branch part 23 is introduced into the windward heat exchange part 21a.

In the present embodiment, the sectional area of the coolant passage in the branch part 23 corresponding to one of the coolant discharge ports is less than the sectional area of the coolant passage in the branch part 23 corresponding to the other of the coolant discharge ports. Consequently, the leeward flow rate Q2 of the coolant passing through the leeward heat exchange part 21b is less than the windward flow rate Q1 of the coolant passing through the windward heat exchange part 21a. More specifically, in the present embodiment, the leeward flow rate Q2 is about 1/15 of the windward flow rate Q1.

The confluence part 24 is constituted by a three-way joint having three introduction and discharge ports in the same manner as the branch part 23. Two of the three introduction and discharge ports are coolant introduction ports, and the other one of the three introduction and discharge ports is a coolant discharge port. The inlet side of the water passage 34b of the evaporation water-refrigerant heat exchanger 34 is connected to the coolant discharge port of the confluence part 24.

In the present embodiment, therefore, when the heat transport refrigeration cycle device 30 is operated, the refrigerant in the heat transport refrigeration cycle device 30 absorbs heat from the downstream coolant, obtained by joining the flow of the coolant discharged from the windward heat exchange part 21a with the flow of the coolant discharged from the leeward heat exchange part 21b, by the evaporation water-refrigerant heat exchanger 34, whereby the refrigerant is evaporated.

The remaining construction and operation are the same as in the first embodiment. Even in the vehicle air conditioner 10 according to the present embodiment, therefore, the interior of the vehicle may be cooled, heated, or dehumidified and heated, in the same manner as in the first embodiment. When the coolant temperature Tw is equal to or lower than the heating determination temperature KHTw, the operation is performed in the strong heating mode or in the strong dehumidification and heating mode, whereby the reduction in the sense of heating that is provided to each occupant may be prevented without the reduction of vehicle fuel efficiency.

In the vehicle air conditioner 10 according to the present embodiment, the heater core 21 has the two heat exchange parts, i.e. the windward heat exchange part 21a and the leeward heat exchange part 21b. The coolant discharged from the engine EG is introduced into the windward heat exchange part 21a, and the coolant discharged from the water passage 32b of the heat-dissipation water-refrigerant heat exchanger 32 is introduced into the leeward heat exchange part 21b.

In the strong heating mode or in the strong dehumidification and heating mode, therefore, the temperature of the upstream coolant introduced into the leeward heat exchange part 21b becomes higher than the temperature of the upstream coolant introduced into the windward heat exchange part 21a. As a result, the temperature difference between the coolant and ventilation air in both the heat exchange parts 21a and 21b may be secured, whereby the ventilation air may be efficiently heated.

In the vehicle air conditioner 10 according to the present embodiment, the leeward flow rate Q2 of the coolant passing through the leeward heat exchange part 21b is less than the windward flow rate Q1 of the coolant passing through the windward heat exchange part 21a. Compared with the first embodiment, therefore, the flow rate of the coolant passing through the water passage 32b of the heat-dissipation water-refrigerant heat exchanger 32 may be reduced.

Consequently, the amount of heat that the coolant absorbs from the high-pressure refrigerant in the heat-dissipation water-refrigerant heat exchanger 32, i.e. the amount of heat that the refrigerant dissipates to the coolant in the heat-dissipation water-refrigerant heat exchanger 32, is reduced, whereby the cycle balance in the heat transport refrigeration cycle device 30 is changed so as to increase the pressure of the refrigerant (the refrigerant condensing temperature) in the refrigerant passage 32a of the heat-dissipation water-refrigerant heat exchanger 32.

In the strong heating mode or in the strong dehumidification and heating mode of the present embodiment, therefore, the temperature of the coolant heated by the heat-dissipation water-refrigerant heat exchanger 32 may be increased without increasing the rate of rotation of the heat transport compressor 31, compared with the first embodiment. As a result, the ventilation air may be sufficiently heated by the heater core 21, whereby the reduction in the sense of heating that is provided to each occupant may be further prevented.

In the strong heating mode or in the strong dehumidification and heating mode of the vehicle air conditioner 10 according to the present embodiment, heat of the downstream coolant, obtained by joining the flow of the coolant discharged from the windward heat exchange part 21a with the flow of the coolant discharged from the leeward heat exchange part 21b, is absorbed by the refrigerant in the heat transport refrigeration cycle device 30.

Consequently, the temperature of the upstream coolant introduced into the heater core 21 may be assuredly heated so as to be equal to or higher than the heating determination temperature KHTw by the heat-dissipation water-refrigerant heat exchanger 32 without a deficiency in the amount of heat that is absorbed as in the case in which heat of the coolant discharged from one of the heat exchange parts is absorbed.

Third Embodiment

Figure 6:
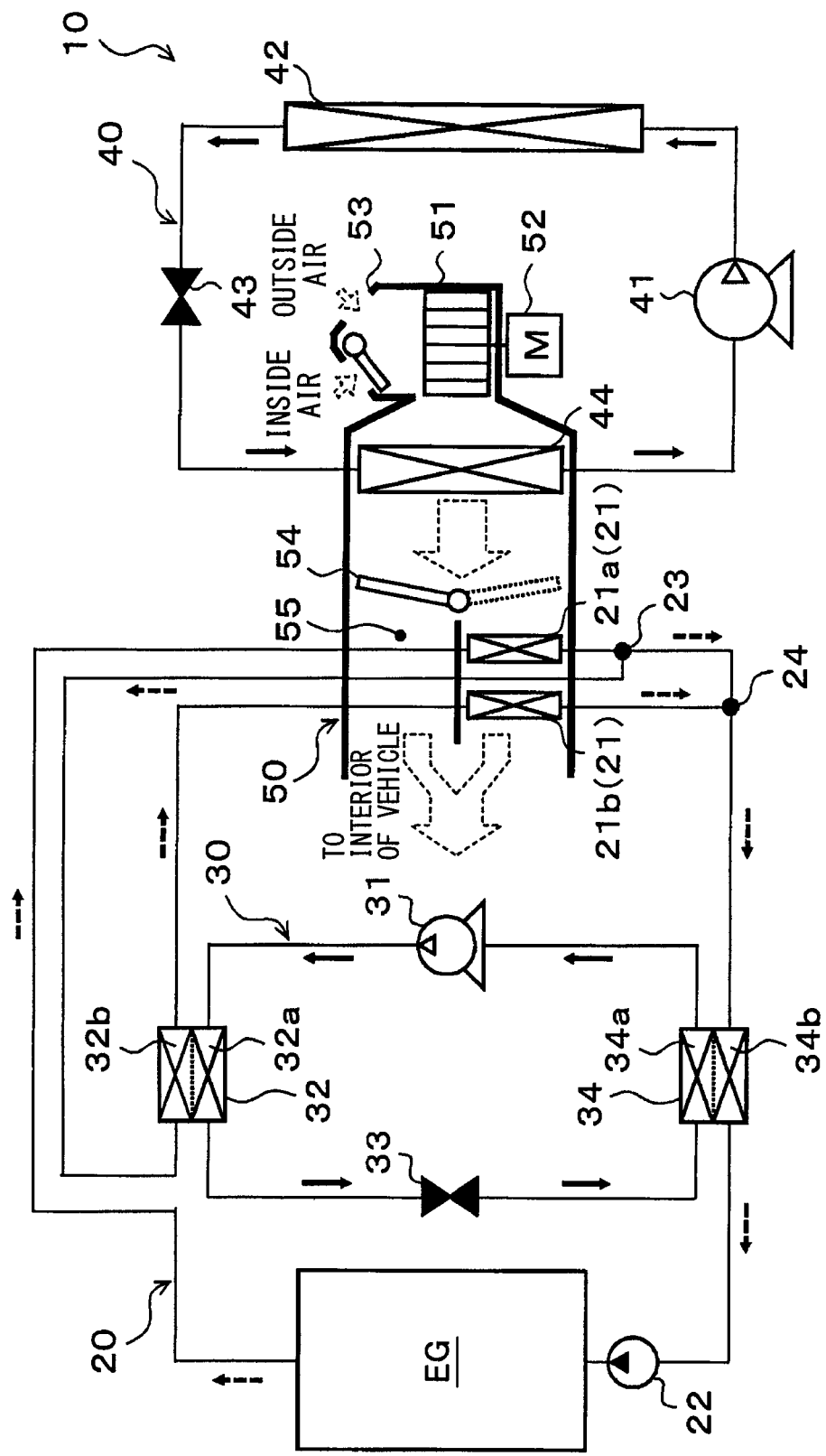
FIG. 6 is a view showing the overall construction of a vehicle air conditioner according to a third embodiment.

In the present embodiment, a description will be given of an example in which the construction of the water circulation circuit 20 and the heater core 21 is modified in the first embodiment, as shown in an overall construction view of FIG. 6. More specifically, the water circulation circuit 20 of the present embodiment has a windward heat exchange part 21a and a leeward heat exchange part 21b, which are the same as those of the second embodiment. In the water circulation circuit 20 of the present embodiment, the branch part 23 is disposed downstream of the coolant outlet of the windward heat exchange part 21a.

The inlet side of the water passage 32b of the heat-dissipation water-refrigerant heat exchanger 32 is connected to one of the coolant discharge ports of the branch part 23 of the present embodiment. The coolant inlet side of the leeward heat exchange part 21b is connected to the outlet side of the water passage 32b of the heat-dissipation water-refrigerant heat exchanger 32. One of the coolant introduction ports of the confluence part 24 is connected to the other of the coolant discharge ports of the branch part 23, and the other of the coolant introduction ports of the confluence part 24 is connected to coolant outlet side of the leeward heat exchange part 21b.

That is, the water circulation circuit 20 of the present embodiment is configured such that, when the heat transport refrigeration cycle device 30 is operated, the upstream coolant discharged from one of the coolant discharge ports of the branch part 23 is heated by the heat-dissipation water-refrigerant heat exchanger 32 and is then introduced into the leeward heat exchange part 21b, and the coolant discharged from the other of the coolant discharge ports of the branch part 23 joins the coolant discharged from the leeward heat exchange part 21b.

The remaining construction and operation are the same as in the second embodiment. Even in the vehicle air conditioner 10 according to the present embodiment, therefore, the interior of the vehicle may be cooled, heated, or dehumidified and heated, in the same manner as in the first embodiment. When the coolant temperature Tw is equal to or lower than the heating determination temperature KHTw, the operation is performed in the strong heating mode or in the strong dehumidification and heating mode, whereby the reduction in the sense of heating that is provided to each occupant may be prevented without the reduction of vehicle fuel efficiency.

Even in the vehicle air conditioner 10 according to the present embodiment, the heater core 21 has the two heat exchange parts 21a and 21b, which are arranged in series in the direction in which ventilation air flows, whereby the same effects as in the second embodiment may be obtained.

Fourth Embodiment

Figure 7:
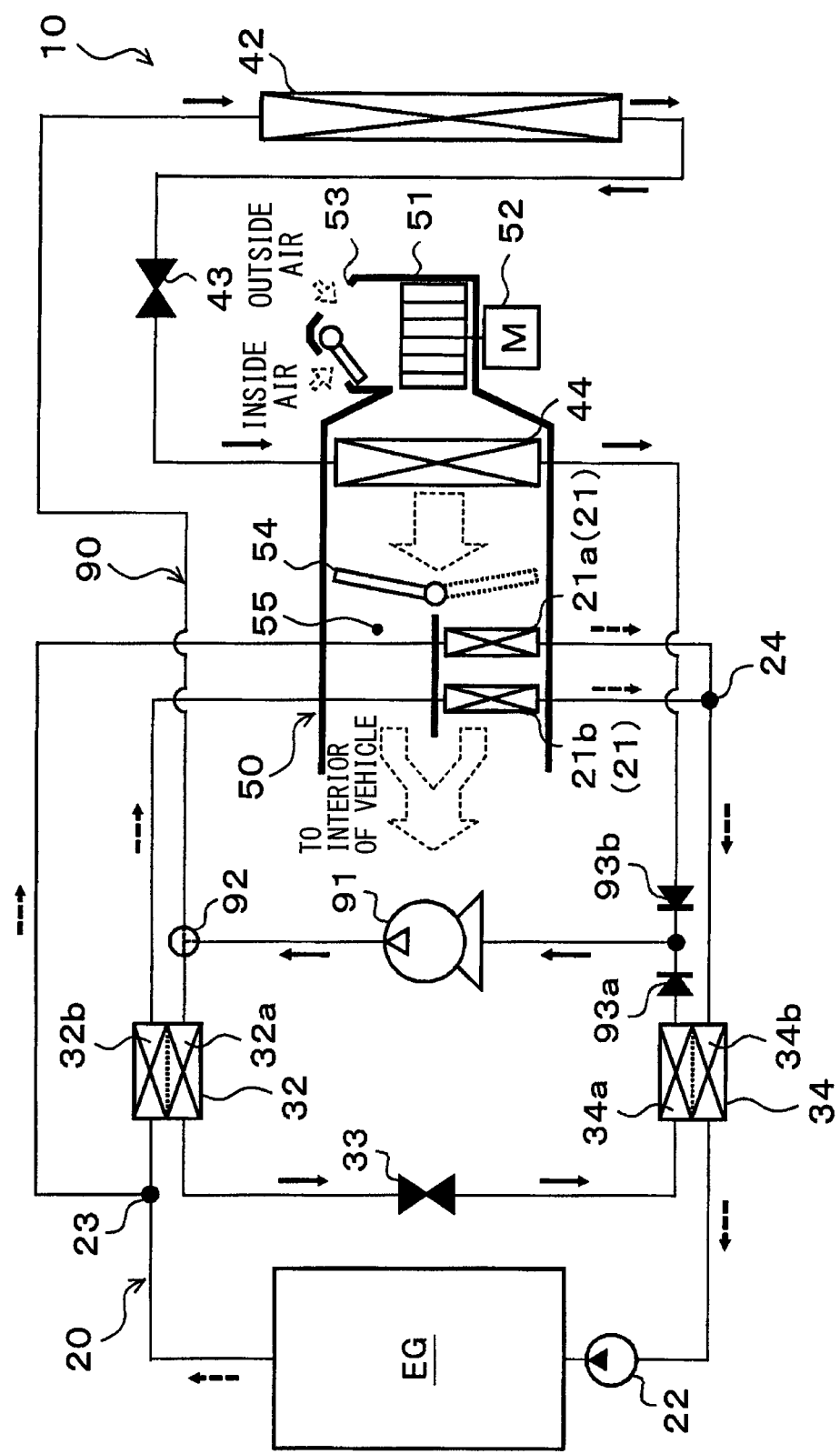
FIG. 7 is a view showing the overall construction of a vehicle air conditioner according to a fourth embodiment.

In the present embodiment, a description will be given of an example in which a common compressor 91 is used instead of the heat transport compressor 31 of the heat transport refrigeration cycle device 30 and the cooling compressor 41 of the cooling refrigeration cycle device 40 and a single refrigeration cycle device 90 is used instead of the heat transport refrigeration cycle device 30 and the cooling refrigeration cycle device 40 in the second embodiment, as shown in an overall construction view of FIG. 7.

First, the compressor 91 of the present embodiment is identical in basic construction to the heat transport compressor 31 and the cooling compressor 41. In the present embodiment, a compressor having a greater discharge capacity than the cooling compressor 41 is used as the compressor 91. The coolant inlet side of a three-way flow control valve 92 is connected to the discharge port of the cooling compressor 41.

The compressor 91 of the present embodiment is identical in basic construction to the heat transport compressor 31 and the cooling compressor 41. In the present embodiment, a compressor having a greater discharge capacity than the cooling compressor 41 is used as the compressor 91. The coolant inlet side of a three-way flow control valve 92 is connected to the discharge port of the cooling compressor 41.

The three-way flow control valve 92 is an electric flow control valve for controlling the ratio of the flow of the refrigerant discharged from the compressor 91 and introduced into the heat-dissipation water-refrigerant heat exchanger 32 to the flow of the refrigerant discharged from the compressor 91 and introduced into the radiator 42. The operation of the three-way flow control valve 92 is controlled according to a control signal output from the air conditioning control device 60.

The three-way flow control valve 92 of the present embodiment may introduce all of the refrigerant discharged from the compressor 91 into the radiator 42 or into the heat-dissipation water-refrigerant heat exchanger 32. Consequently, the three-way flow control valve 92 of the present embodiment also functions as a refrigerant circuit switching device for performing switching between the coolant circuits.

The inlet side of the compressor 91 is connected to one of the refrigerant discharge ports of the three-way flow control valve 92 via the heat-dissipation water-refrigerant heat exchanger 32, the fixed heat transport diaphragm 33, and the evaporation water-refrigerant heat exchanger 34. A heat transport check valve 93a for allowing the refrigerant to flow only from the outlet side of the refrigerant passage 34a of the evaporation water-refrigerant heat exchanger 34 to the inlet side of the compressor 91 is disposed in a refrigerant path from the outlet side of the refrigerant passage 34a of the evaporation water-refrigerant heat exchanger 34 to the inlet side of the compressor 91.

The inlet side of the compressor 91 is connected to the other of the refrigerant discharge ports of the three-way flow control valve 92 via the radiator 42, the cooling expansion valve 43, and the evaporator 44. A cooling check valve 93b for allowing the refrigerant to flow only from the refrigerant outlet side of the evaporator 44 to the inlet side of the compressor 91 is disposed in a refrigerant path from the refrigerant outlet side of the evaporator 44 to the inlet side of the compressor 91. The remaining construction is the same as in the second embodiment.

Next, the operation of the vehicle air conditioner with the above-stated construction according to the present embodiment will be described. In the cooling mode of the vehicle air conditioner 10 according to the present embodiment, the air conditioning control device 60 operates the compressor 91 in the same manner as in the second embodiment, and controls the operation of the three-way flow control valve 92 such that all of the refrigerant discharged from the compressor 91 is introduced into the radiator 42.

In the heating mode, the air conditioning control device 60 stops the compressor 91. In the dehumidification and heating mode, the air conditioning control device 60 operates the compressor 91 in the same manner as in the second embodiment, and controls the operation of the three-way flow control valve 92 such that all of the refrigerant discharged from the compressor 91 is introduced into the radiator 42.

In the strong heating mode or the strong dehumidification and heating mode, the air conditioning control device 60 operates the compressor 91 so as to exhibit the same refrigerant discharge capacity as in the heating mode and in the dehumidification and heating mode. the air conditioning control device 60 controls the operation of the three-way flow control valve 92 such that some of the refrigerant discharged from the compressor 91 is introduced into the radiator 42 and the remaining refrigerant is introduced into the refrigerant passage 32a of the heat-dissipation water-refrigerant heat exchanger 32. The remaining operation is the same as in the second embodiment.

Consequently, the vehicle air conditioner 10 according to the present embodiment is operated in completely the same manner as in the second embodiment, thereby the same effects may be obtained. In the present embodiment, a single compressor 91 is used instead of the heat transport compressor 31 and the cooling compressor 41, whereby the vehicle air conditioner 10 may be miniaturized and manufacturing cost thereof may be reduced.

Fifth Embodiment

Figure 8:
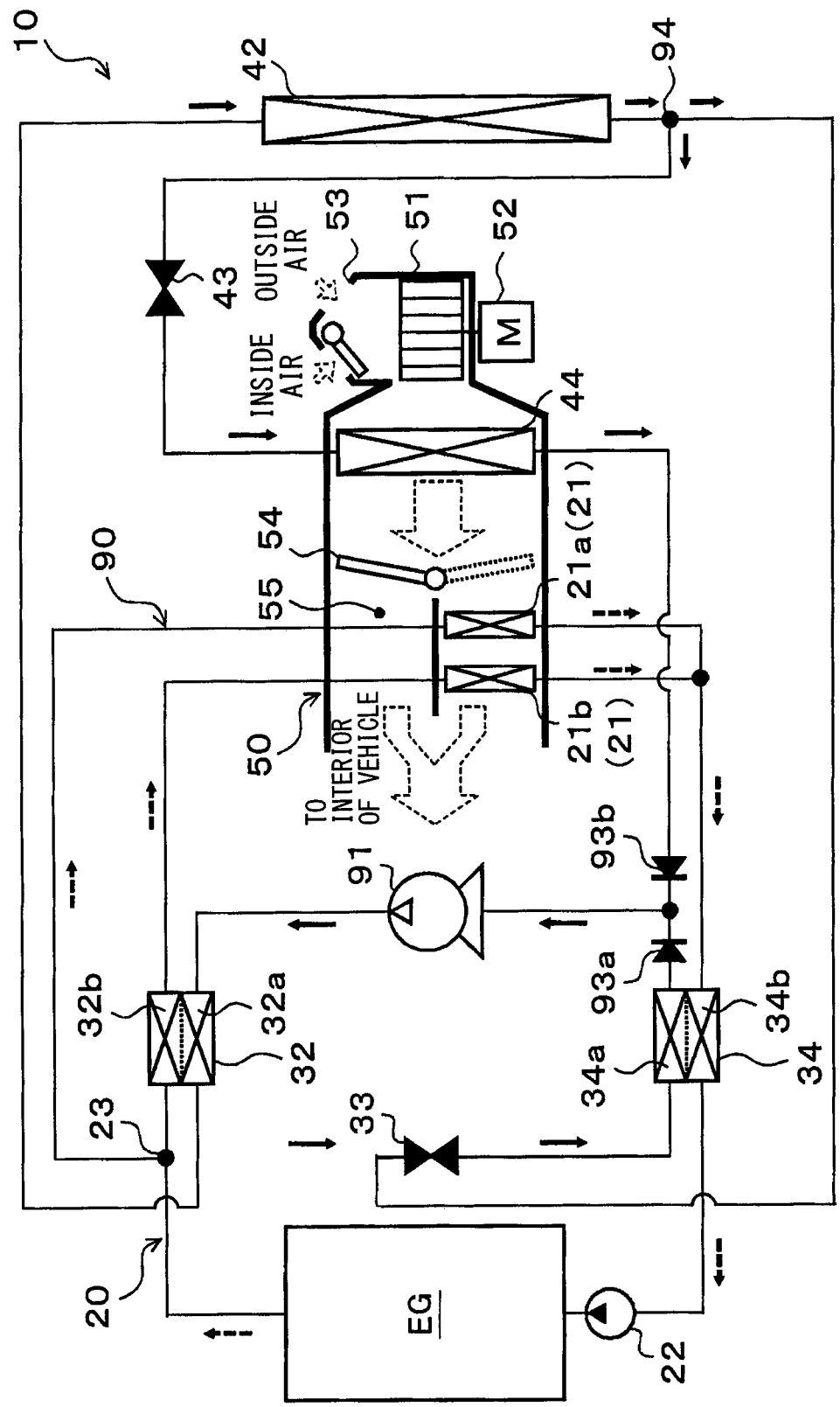
FIG. 8 is a view showing the overall construction of a vehicle air conditioner according to a fifth embodiment.

In the present embodiment, a description will be given of an example in which the same compressor 91 as in the fourth embodiment is used and a single refrigeration cycle device 90 is used instead of the heat transport refrigeration cycle device 30 and the cooling refrigeration cycle device 40 in the second embodiment, as shown in an overall construction view of FIG. 8.

More specifically, in the present embodiment, the inlet side of the refrigerant passage 32a of the heat-dissipation water-refrigerant heat exchanger 32 is connected to the outlet side of the compressor 91, and the refrigerant inlet side of the radiator 42 is connected to the outlet side of the refrigerant passage 32a. A refrigerant branch part 94 for dividing the refrigerant discharged from the radiator 42 is disposed at the refrigerant outlet side of the radiator 42.

The inlet side of the compressor 91 is connected to one of the refrigerant discharge ports of the refrigerant branch part 94 via the fixed heat transport diaphragm 33, the evaporation water-refrigerant heat exchanger 34, and the heat transport check valve 93a. The inlet side of the compressor 91 is connected to the other of the refrigerant discharge ports of the refrigerant branch part 94 via the cooling expansion valve 43, the evaporator 44, and the cooling check valve 93b. The remaining construction is the same as in the second embodiment.

Next, the operation of the vehicle air conditioner with the above-stated construction according to the present embodiment will be described. The present embodiment is configured such that, when the compressor 91 is operated, the refrigerant discharged from the compressor 91 is introduced into the refrigerant passage 32a of the heat-dissipation water-refrigerant heat exchanger 32, whereby no operation is performed in the strong heating mode and the dehumidification and heating mode.

First, in the cooling mode, the air conditioning control device 60 operates the compressor 91 in the same manner as in the fourth embodiment. In the heating mode, the air conditioning control device 60 stops the compressor 91. In the dehumidification and heating mode, the air conditioning control device 60 operates the compressor 91 so as to exhibit the same refrigerant discharge capacity as in the fourth embodiment. The remaining operation is the same as in the fourth embodiment.

In the cooling mode of the vehicle air conditioner 10 according to the present embodiment, the air mixing door 54 closes the air passage on the heater core 21 side even though heat exchange between the coolant and the refrigerant discharged from the compressor 91 is performed by the heat-dissipation water-refrigerant heat exchanger 32, whereby the interior of the vehicle may be cooled in the same manner as in the second embodiment. In the heating mode, the interior of the vehicle may be heated in entirely the same manner as in the second embodiment.

In the strong dehumidification and heating mode, the coolant, heated by the heat-dissipation water-refrigerant heat exchanger 32 until the temperature of the coolant becomes equal to or higher than the heating determination temperature KHTw (specifically, 60° C.), may be introduced into the leeward heat exchange part 21b, whereby the reduction in the sense of heating that is provided to each occupant may be prevented without the reduction of vehicle fuel efficiency, in the same manner as in the second embodiment.

In the present embodiment, a single compressor 91 is used instead of the heat transport compressor 31 and the cooling compressor 41, whereby the vehicle air conditioner 10 may be miniaturized and the manufacturing cost thereof may be reduced, in the same manner as in the fourth embodiment.

Sixth Embodiment

Figure 9:
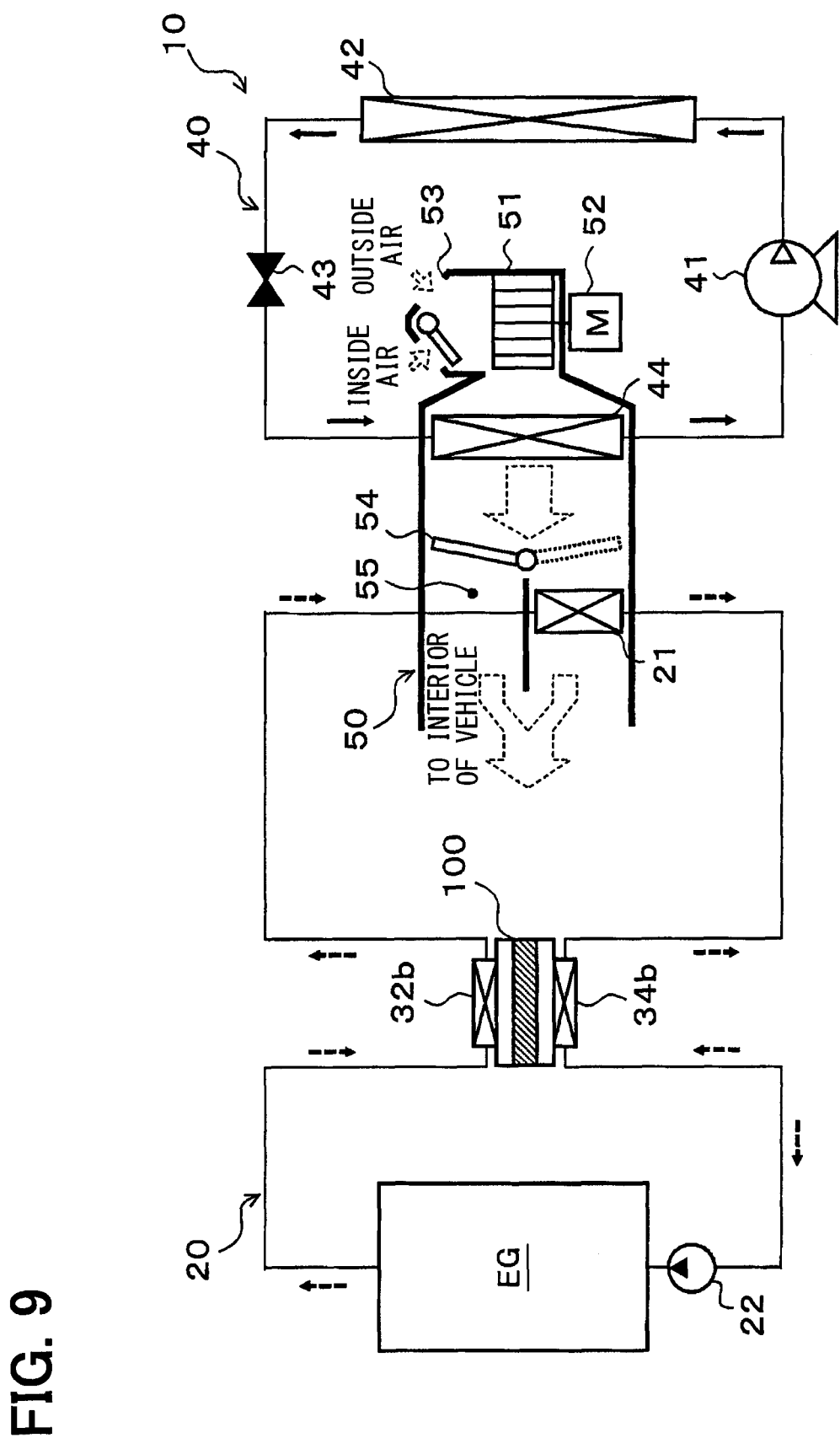
FIG. 9 is a view showing the overall construction of a vehicle air conditioner according to a sixth embodiment.

In the first embodiment, an example in which the heat transport refrigeration cycle device 30 is used as the heat transport unit has been described. In the present embodiment, however, a Peltier element 100 is used as the heat transport unit, as shown in an overall construction view of FIG. 9. The Peltier element 100 is a plate-shaped semiconductor element that uses the Peltier effect. When electric power from the air conditioning control device 60 is supplied to the Peltier element, heat absorbed into the Peltier element through one surface thereof may be dissipated from the Peltier element through the other surface thereof.

In the present embodiment, the water passage 34b for allowing the downstream coolant to flow therethrough is joined to one surface of the Peltier element 100, and the water passage 32b for allowing the upstream coolant to flow therethrough is joined to the other surface of the Peltier element 100. Consequently, the Peltier element 100 may dissipate heat absorbed from the downstream coolant passing through the water passage 34b to the upstream coolant passing through the water passage 32b.

The heat transport controller 60a of the present embodiment controls the operation of the Peltier element 100. Specifically, the heat transport controller 60a of the present embodiment supplies electric power to the Peltier element 100 in the strong heating mode or in the strong dehumidification and heating mode. The remaining construction and operation are the same as in the first embodiment. Even in the vehicle air conditioner 10 according to the present embodiment, therefore, the same effects as in the first embodiment may be obtained.

OTHER EMBODIMENTS

The present disclosure is not limited to the above embodiments. Various modifications are possible as follows without departing from the gist of the present disclosure.

(1) In the above embodiments, the vehicle air conditioner 10 according to the present disclosure has been described as being applied to a hybrid vehicle, to which, however, application of the vehicle air conditioner 10 is not limited. For example, the vehicle air conditioner according to the present disclosure may be applied to an idle stop vehicle, in which the engine is intermittently operated.

(2) In the above second to sixth embodiments, the heater core 21 has been described as having the two heat exchange parts, i.e. the windward heat exchange part 21a and the leeward heat exchange part 21b. However, the heater core 21 may have three or more heat exchange parts as long as the heater core 21 has at least two heat exchange parts arranged in series in the direction in which ventilation air flows.

(3) In the above second to sixth embodiments, the example in which the leeward flow rate Q2 of the coolant passing through the leeward heat exchange part 21b is less than the windward flow rate Q1 of the coolant passing through the windward heat exchange part 21a has been described, to which, however, the present disclosure is not limited. The windward flow rate Q1 and the leeward flow rate Q2 may be the same.

(4) The elements and devices disclosed in the above embodiments may be appropriately combined within an implementable range. For example, a common compressor 91 may be used instead of the heat transport compressor 31 of the heat transport refrigeration cycle device 30 and the cooling compressor 41 of the cooling refrigeration cycle device 40, as described in the third embodiment, and a single refrigeration cycle device 90 may be used instead of the heat transport refrigeration cycle device 30 and the cooling refrigeration cycle device 40, as described in the fourth and fifth embodiments.

In the vehicle air conditioner 10 according to each of the second to fifth embodiments, the Peltier element 100 may be used as the heat transport unit.

What is claimed is:

1. An air conditioner for a vehicle, comprising:
a water circulation circuit circulating a coolant that cools an internal combustion engine for outputting driving force necessary to move a vehicle;
a heating heat exchanger disposed in the water circulation circuit, and performing heat exchange between the coolant heated by the internal combustion engine and ventilation air to be blown to an interior of the vehicle to heat the ventilation air; and
a refrigerant cycle device that absorbs heat from a downstream coolant flowing through a coolant channel in the water circulation circuit from a coolant outlet side of the heating heat exchanger to a coolant inlet side of the internal combustion engine, and dissipates the heat absorbed from the downstream coolant to an upstream coolant flowing through a coolant channel in the water circulation circuit from a coolant outlet side of the internal combustion engine to a coolant inlet side of the heating heat exchanger, wherein
the refrigerant cycle device includes a compressor configured to compress refrigerant, a first water-refrigerant heat exchanger in which a high-pressure refrigerant discharged from the compressor is heat exchanged with the upstream coolant, and a second water-refrigerant heat exchanger in which refrigerant to be drawn into the compressor flows, disposed in the coolant channel between a joint part and the coolant inlet side of the internal combustion engine,
the heating heat exchanger includes a plurality of heat exchangers arranged in series in a flow direction of the ventilation air,
the plurality of heat exchangers includes a leeward heat exchanger disposed at a downstream most side in the flow direction of the ventilation air, and a windward heat exchanger disposed at an upstream side in the flow direction of the ventilation air with respect to the leeward heat exchanger,
the water circulation circuit includes a branch part at which a flow of the upstream coolant is branched into a first branch passage and a second branch passage, and the joint part at which the first branch passage and the second branch passage are joined,
the first water-refrigerant heat exchanger and the leeward heat exchanger are disposed in the first branch passage, and the first water-refrigerant heat exchanger is located at an upstream side of the leeward heat exchanger in the flow of the coolant in the first branch passage to heat the coolant flowing to the leeward heat exchanger in the first branch passage, and
the windward heat exchanger is disposed in the second branch passage.

2. The air conditioner for a vehicle according to claim 1, wherein a leeward flow rate of the coolant passing through the leeward heat exchanger is less than a windward flow rate of the coolant passing through the windward heat exchanger.

3. The air conditioner for a vehicle according to claim 1, wherein
the water circulation circuit is configured to heat the upstream coolant, discharged from a first coolant discharge port of the branch part, by using the refrigerant cycle device and then to introduce the heated upstream coolant into the leeward heat exchanger and to introduce the upstream coolant, discharged from a second coolant discharge port of the branch part, into the windward heat exchanger.

4. The air conditioner for a vehicle according to claim 1, wherein
the water circulation circuit is configured to heat the upstream coolant discharged from a first coolant discharge port of the branch part by using the refrigerant cycle device and then introduce the heated upstream coolant into the leeward heat exchanger and to join the downstream coolant discharged from a second coolant discharge port of the branch part with the coolant discharged from the leeward heat exchanger.

5. The air conditioner for a vehicle according to claim 1, wherein the refrigerant cycle device is configured to absorb heat from the downstream coolant that is obtained by joining a flow of the coolant discharged from the windward heat exchanger with a flow of the coolant discharged from the leeward heat exchanger.

6. The air conditioner for a vehicle according to claim 1, wherein
the refrigerant cycle device is constituted by a vapor-compression refrigeration cycle device, and
the vapor-compression refrigeration cycle device includes
a heat-dissipation water-refrigerant heat exchanger that performs heat exchange between the high-pressure refrigerant discharged from the compressor for compressing the refrigerant, and the upstream coolant, and
an evaporation water-refrigerant heat exchanger that performs heat exchange between a low-pressure refrigerant drawn into the compressor and the downstream coolant.

7. The air conditioner for a vehicle according to claim 1, wherein
the branch part is a three way branch joint including a coolant introduction port and two coolant discharge ports, and
the joint part is a three way joint including two coolant introduction ports and a coolant discharge port.

8. The air conditioner for a vehicle according to claim 1, wherein the leeward flow rate of the coolant passing through the leeward heat exchanger is 1/15 of the windward flow rate of the coolant passing through the windward heat exchanger.

9. The air conditioner for a vehicle according to claim 1 further comprising a casing defining an air passage wherein the ventilation air to be blown to the interior of the vehicle flows therethrough.

10. The air conditioner for a vehicle according to claim 9, wherein the leeward heat exchanger and the windward heat exchanger are disposed in the casing and the first water-refrigerant heat exchanger is disposed outside of the casing.

11. The air conditioner for a vehicle according to claim 9, wherein the leeward heat exchanger and the windward heat exchanger are disposed in the casing and the second water-refrigerant heat exchanger is disposed outside of the casing.

12. The air conditioner for a vehicle according to claim 9, wherein the leeward heat exchanger and the windward heat exchanger are disposed in the casing, and the first water-refrigerant heat exchanger and the second water-refrigerant heat exchanger are disposed outside of the casing.

* * * * *